US010049283B2

(12) United States Patent
Matsumoto et al.

(10) Patent No.: US 10,049,283 B2
(45) Date of Patent: Aug. 14, 2018

(54) STAY CONDITION ANALYZING APPARATUS, STAY CONDITION ANALYZING SYSTEM, AND STAY CONDITION ANALYZING METHOD

(71) Applicant: PANASONIC INTELLECTUAL PROPERTY MANAGEMENT CO., LTD., Oaska (JP)

(72) Inventors: Yuichi Matsumoto, Kanagawa (JP); Hiroaki Yoshio, Kanagawa (JP); Youichi Gouda, Ishikawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 401 days.

(21) Appl. No.: 14/668,047

(22) Filed: Mar. 25, 2015

(65) Prior Publication Data
US 2015/0278608 A1    Oct. 1, 2015

(30) Foreign Application Priority Data

Mar. 26, 2014    (JP) ................. 2014-063547

(51) Int. Cl.
*G06K 9/00*    (2006.01)
*H04N 7/18*    (2006.01)
(Continued)

(52) U.S. Cl.
CPC ..... *G06K 9/00778* (2013.01); *G06K 9/00342* (2013.01); *G06K 9/00369* (2013.01);
(Continued)

(58) Field of Classification Search
None
See application file for complete search history.

(56) References Cited

U.S. PATENT DOCUMENTS 7,436,887 B2 * 10/2008 Yeredor ............ G06K 9/00771
375/240.01
7,688,349 B2 *  3/2010 Flickner ............ G06K 9/00362
348/150
(Continued)

FOREIGN PATENT DOCUMENTS

JP     2009-134688     6/2009
JP     2013-058063     3/2013

OTHER PUBLICATIONS

Extended European Search Report dated Aug. 18, 2015 for European Patent Application No. 15160163.0.

*Primary Examiner* — Frederick D Bailey
(74) *Attorney, Agent, or Firm* — Greenblum & Bernstein, P.L.C.

(57) ABSTRACT

Provided is a stay condition analyzing apparatus including a stay information acquirer which acquires stay information for each predetermined measurement period of time on the basis of positional information of a moving object which is acquired from a captured image of a target area, a heat map image generator which generates a heat map image obtained by visualizing the stay information, a background image generator which generates a background image from the captured image, and a display image generator which generates a display image by superimposing the heat map image on the background image. The background image generator generates the background image by performing image processing for reducing discriminability of the moving object appearing in the captured image on the captured image.

7 Claims, 22 Drawing Sheets

(51) Int. Cl.
    *G06T 11/60*     (2006.01)
    *G06T 11/00*     (2006.01)
    *G06T 11/20*     (2006.01)

(52) U.S. Cl.
    CPC ........ *G06K 9/00771* (2013.01); *G06T 11/001* (2013.01); *G06T 11/206* (2013.01); *G06T 11/60* (2013.01); *H04N 7/183* (2013.01)

(56) References Cited

U.S. PATENT DOCUMENTS

| | | | | |
|---|---|---|---|---|
| 9,679,200 | B2* | 6/2017 | Schlattmann | G06K 9/00624 |
| 2004/0207882 | A1* | 10/2004 | Ahmed | G06T 7/194 |
| | | | | 358/3.26 |
| 2006/0244764 | A1* | 11/2006 | Ahmad | G06T 5/008 |
| | | | | 345/629 |
| 2008/0211908 | A1* | 9/2008 | Dvir | G08B 13/19604 |
| | | | | 348/143 |
| 2009/0033745 | A1* | 2/2009 | Yeredor | G01S 3/7864 |
| | | | | 348/152 |
| 2009/0074246 | A1* | 3/2009 | Distante | A63B 71/0605 |
| | | | | 382/103 |
| 2009/0134968 | A1 | 5/2009 | Girgensohn et al. | |
| 2009/0238411 | A1* | 9/2009 | Adiletta | G06K 9/00771 |
| | | | | 382/107 |
| 2009/0245657 | A1* | 10/2009 | Osugi | G06K 9/00791 |
| | | | | 382/209 |
| 2009/0263021 | A1* | 10/2009 | Takamori | G06K 9/00771 |
| | | | | 382/181 |
| 2010/0013931 | A1* | 1/2010 | Golan | G06K 9/00771 |
| | | | | 348/150 |
| 2010/0141737 | A1* | 6/2010 | Li | G06T 3/4038 |
| | | | | 348/36 |
| 2011/0228984 | A1* | 9/2011 | Papke | G06K 9/00771 |
| | | | | 382/103 |
| 2012/0163657 | A1* | 6/2012 | Shellshear | G06K 9/00751 |
| | | | | 382/103 |
| 2012/0242851 | A1* | 9/2012 | Fintel | H04N 5/23222 |
| | | | | 348/221.1 |
| 2013/0298083 | A1* | 11/2013 | Bertoldo | G06F 3/0482 |
| | | | | 715/835 |
| 2015/0117835 | A1* | 4/2015 | Yabuuchi | G08B 13/19613 |
| | | | | 386/230 |

* cited by examiner

BACKGROUND IMAGE

DISPLAY IMAGE

FIRST MEASUREMENT AREA   SECOND MEASUREMENT AREA

FIRST MEASUREMENT AREA   SECOND MEASUREMENT AREA

PERSON FRAME

STAY CONDITION ANALYZING APPARATUS, STAY CONDITION ANALYZING SYSTEM, AND STAY CONDITION ANALYZING METHOD

TECHNICAL FIELD

The present invention relates to a stay condition analyzing apparatus, a stay condition analyzing system, and a stay condition analyzing method for acquiring stay information regarding a stay condition of a moving object within a target area, generating a heat map image obtained by visualizing the stay information, and displaying the heat map image on a display device.

BACKGROUND OF THE INVENTION

In a checkout counter of a store, an increase in the number of customers desiring accounting results in a queue for accounting, which makes the customers wait for a long time. However, if it is possible to ascertain a stay condition of a customers in the vicinity of the checkout counter, that is, how many customers are staying in the vicinity of the checkout counter, an improvement in customer satisfaction and an effective store operation can be achieved by considering an improvement measure at the time of operating the store, on the basis of the stay condition of a customer.

As a technique related to a desire to ascertain such a stay condition of a person, a technique of acquiring stay information regarding a stay condition of a person within a target area, generating a heat map image obtained by visualizing the stay information, and displaying the heat map image on a display device has been known hitherto (see Japanese Patent Unexamined Publication No. 2009-134688). Using of such a heat map image allows a user to ascertain, at first sight, a stay condition of a person within a target area, that is, where and how many persons are staying, and thus it is possible to improve user convenience.

Only in the heat map image obtained by visualizing stay information, it is difficult to ascertain a stay condition of a person in association with a position within the target area, that is, it is difficult for a user to ascertain where the person is staying within the target area. For this reason, in the above-mentioned technique of the related art, a plan view of the target area is used as a background image, and a heat map image is superimposed thereon and displayed. Particularly, in the above-mentioned technique of the related art, stay information is acquired from images captured by a plurality of cameras that share and image a target area, and one heat map image is generated from the stay information. For this reason, it is necessary to use a plan view of the target area as a background image. However, when a heat map image is generated from an image obtained by capturing the target area using one camera, it is easy to use the image captured by one camera as a background image.

However, as described above, when a captured image is used as a background image, the background image is a captured image at a certain point in time, while a heat map image is an image generated from captured images at a plurality of times within a predetermined measurement period of time. For this reason, the background image and the heat map image do not match, that is, an actual stay state of a person appearing in the background image and a stay state shown in the heat map image may be greatly different from each other. Accordingly, when the background image and the heat map image do not match, there is a problem in that a user may be given an uncomfortable feeling.

SUMMARY OF THE INVENTION

A stay condition analyzing apparatus of the invention acquires stay information regarding a stay condition of a moving object within a target area, generates a heat map image obtained by visualizing the stay information, and displays the heat map image on a display device. The stay condition analyzing apparatus includes a stay information acquirer which acquires the stay information for each predetermined measurement period of time on the basis of positional information of the moving object which is acquired from a captured image of the target area, a heat map image generator which generates the heat map image obtained by visualizing the stay information acquired by the stay information acquirer, a background image generator which generates a background image from the captured image, and a display image generator which generates a display image by superimposing the heat map image generated by the heat map image generator on the background image generated by the background image generator. The background image generator generates the background image by performing image processing for reducing discriminability of the moving object appearing in the captured image on the captured image.

DETAILED DESCRIPTION OF THE PREFERRED EMBODIMENTS

Figure 1:
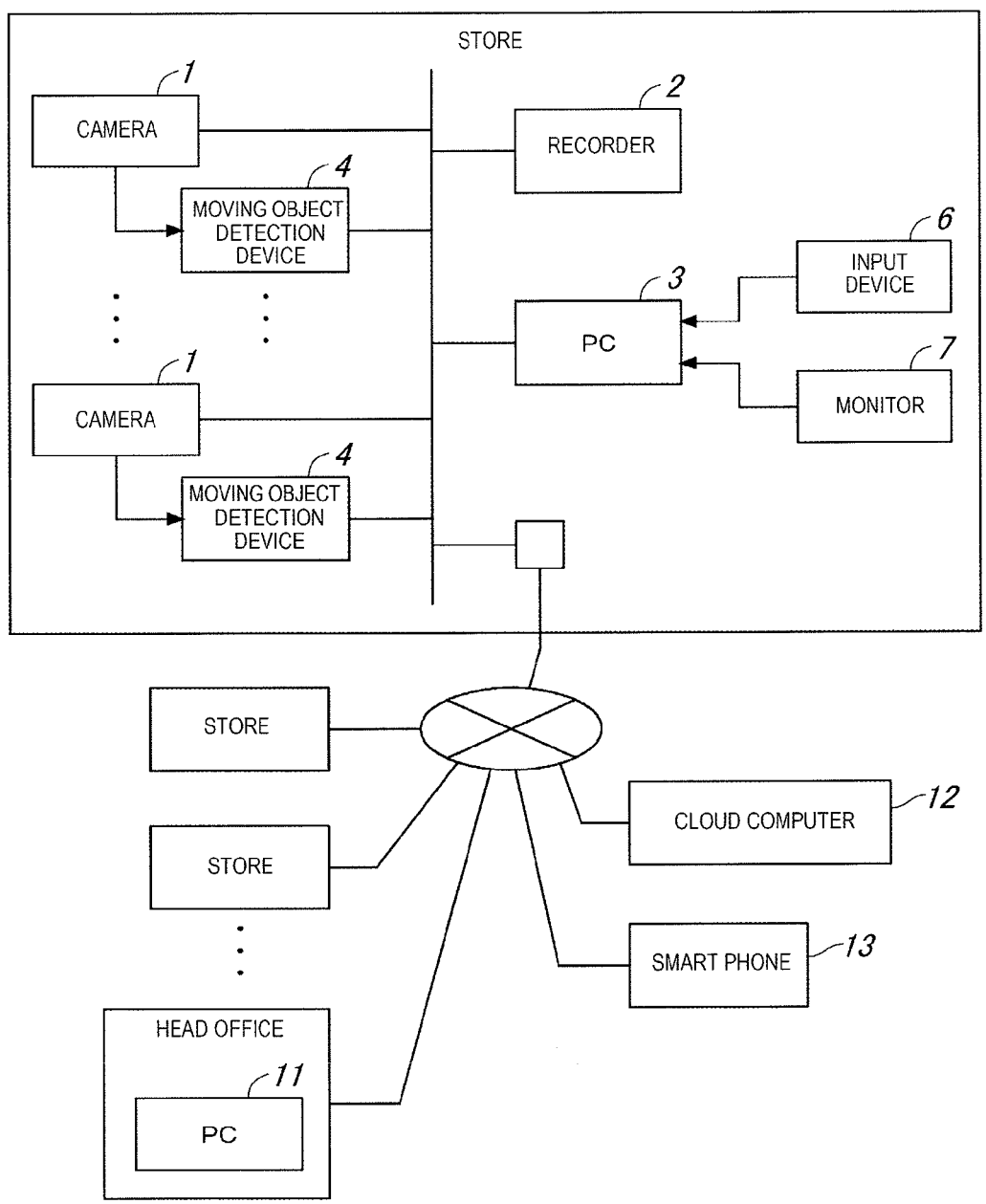
FIG. 1 is a configuration diagram showing the entire stay condition analyzing system according to a first exemplary embodiment.

The invention is contrived in order to solve the above-mentioned problems of the related art, and the main object thereof is to provide a stay condition analyzing apparatus, a stay condition analyzing system, and a stay condition analyzing method which are capable of obtaining a natural display image by reducing an uncomfortable feeling due to mismatch between a background image generated from a captured image of the target area and a heat map image obtained by visualizing stay information of a moving object within a target area when the heat map image is superimposed on the background image and displayed.

According to a first invention, there is provided a stay condition analyzing apparatus that acquires stay information regarding a stay condition of a moving object within a target area, generates a heat map image obtained by visualizing the stay information, and displays the heat map image on a display device. The stay condition analyzing apparatus includes a stay information acquirer which acquires the stay information for each predetermined measurement period of time on the basis of positional information of the moving object which is acquired from a captured image of the target area, a heat map image generator which generates the heat map image obtained by visualizing the stay information acquired by the stay information acquirer, a background image generator which generates a background image from the captured image, and a display image generator which generates a display image by superimposing the heat map image generated by the heat map image generator on the background image generated by the background image generator. The background image generator generates the background image by performing image processing for reducing discriminability of the moving object appearing in the captured image on the captured image.

Thereby, image processing for reducing the discriminability (visibility) of a moving object appearing in a captured image is performed on the captured image, and thus the moving object appearing in the captured image is not likely to be identified. For this reason, for example, a captured image at a point in time of the termination of a measurement period of time, among captured images within the measurement period of time, is indiscriminately selected as a background image. Accordingly, even when the background image and a heat map image do not match, it is possible to reduce an uncomfortable feeling given to a user.

In a second invention, the background image generator generates the background image by performing blurring processing on the captured image.

Thereby, in the background image, it is difficult to know an exact number of persons, position, and the like while maintaining a state capable of roughly ascertaining an overview of a target area. Therefore, it is possible to reduce an uncomfortable feeling due to mismatch between a background image and a heat map image.

In a third invention, the background image generator generates the background image by performing a process of superimposing a monochromic semitransparent image on the captured image.

Thereby, in the background image, it is difficult to know an exact number of persons, position, and the like while maintaining a state capable of roughly ascertaining an overview of a target area. Therefore, it is possible to reduce an uncomfortable feeling due to mismatch between a background image and a heat map image.

According to a fourth invention, there is provided a stay condition analyzing apparatus that acquires stay information regarding a stay condition of a moving object within a target area, generates a heat map image obtained by visualizing the stay information, and displays the heat map image on a display device. The stay condition analyzing apparatus includes a stay information acquirer which acquires the stay information for each predetermined measurement period of time on the basis of positional information of the moving object which is acquired from a captured image of the target area, a heat map image generator which generates the heat map image obtained by visualizing the stay information acquired by the stay information acquirer, a background image generator which generates a background image from the captured image, and a display image generator which generates a display image by superimposing the heat map image generated by the heat map image generator on the background image generated by the background image generator. The background image generator generates a digest image from a plurality of images captured during the measurement period of time corresponding to the stay information and uses the digest image as the background image.

Thereby, since the digest image reflects a state of a target area covering the whole measurement period of time, the background image matches the heat map image by using the digest image as the background image. Therefore, it is possible to prevent a user from being given an uncomfortable feeling.

In a fifth invention, the background image generator generates an average image as the digest image by obtaining an average value of pixel values in the plurality of captured images for each pixel and using the average value as a pixel value, and uses the average image as the background image.

Thereby, in the average image, an image of a moving object becomes unclear. On the other hand, an image of a static object is maintained in a relatively clear state. Therefore, it is possible to obviously ascertain the state of a target area other than the moving object by using the average image as a background image.

In a sixth invention, the background image generator generates a variance image as the digest image by obtaining a variance of pixel values in the plurality of captured images for each pixel and using the variance as a pixel value, and uses the variance image as the background image.

Thereby, in the variance image, an image of a moving object becomes unclear. On the other hand, an image of a static object is maintained in a relatively clear state. Therefore, it is possible to obviously ascertain the state of a target area other than the moving object by using the variance image as a background image.

In a seventh invention, the background image generator generates an image as the digest image by superimposing an image of a moving object which is extracted from each of the plurality of captured images within the measurement period of time on one captured image, and uses the image as the background image.

Thereby, the images of the moving bodies appearing in the captured images within the measurement period of time are clearly displayed in the digest image, and an image of an object other than the moving object is also clearly displayed. Therefore, it is possible to obviously ascertain the state of a target area including the moving object.

According to an eighth invention, there is provided a stay condition analyzing apparatus that acquires stay information regarding a stay condition of a moving object within a target area, generates a heat map image obtained by visualizing the stay information, and displays the heat map image on a display device. The stay condition analyzing apparatus includes a stay information acquirer which acquires the stay information for each predetermined measurement period of time on the basis of positional information of the moving object which is acquired from a captured image of the target area, a heat map image generator which generates the heat map image obtained by visualizing the stay information acquired by the stay information acquirer, a background image generator which generates a background image from the captured image, and a display image generator which generates a display image by superimposing the heat map image generated by the heat map image generator on the background image generated by the background image generator. The background image generator includes a similarity calculator which calculates a similarity between the captured image and the stay information, and a background image selector which selects the captured image to be used as the background image on the basis of the similarity calculated by the similarity calculator.

Thereby, a captured image having a high similarity to stay information serving as the origin of the heat map image is selected as a background image, and thus the background image matches the heat map image. Therefore, it is possible to prevent a user from being given an uncomfortable feeling.

In a ninth invention, the background image generator further includes an evaluator that evaluates whether or not the captured image is suitable for a background image by comparing the similarity calculated by the similarity calculator with a predetermined threshold value, and selects the captured image evaluated, by the evaluator, to be suitable for a background image as the background image.

Thereby, the background image reliably matches a heat map image. Therefore, it is possible to reliably prevent a user from being given an uncomfortable feeling.

In a tenth invention, the stay information is at least one of a stay degree and a stay duration.

Thereby, a user can ascertain a stay degree, that is, the number of moving bodies staying within a target area. In addition, the user can ascertain a stay duration, that is, the time for which the moving bodies stay within the target area.

According to an eleventh invention, there is provided a stay condition analyzing system that acquires stay information regarding a stay condition of a moving object within a target area, generates a heat map image obtained by visualizing the stay information, and displays the heat map image on a display device, the stay condition analyzing system including a camera which captures an image of the target area, and a plurality of information processing apparatuses. Any of the plurality of information processing apparatuses includes a moving object detector which acquires positional information by detecting a moving object from an image captured by the camera, a stay information acquirer which acquires the stay information for each predetermined measurement period of time on the basis of the positional information of the moving object acquired by the moving object detector, a heat map image generator which generates the heat map image obtained by visualizing the stay information acquired by the stay information acquirer, a background image generator which generates a background image from the captured image, and a display image generator which generates a display image by superimposing the heat map image generated by the heat map image generator on the background image generated by the background image generator. The background image generator generates the background image by performing image processing for reducing discriminability of the moving object appearing in the captured image on the captured image.

Thereby, similarly to the first invention, a captured image is indiscriminately selected as a background image from the capture images within the measurement period of time. Accordingly, even when the background image and a heat map image do not match, it is possible to reduce an uncomfortable feeling given to a user.

According to a twelfth invention, there is provided a stay condition analyzing system that acquires stay information regarding a stay condition of a moving object within a target area, generates a heat map image obtained by visualizing the stay information, and displays the heat map image on a display device, the stay condition analyzing system including a camera which captures an image of the target area, and a plurality of information processing apparatuses. Any of the plurality of information processing apparatuses includes a moving object detector which acquires positional information by detecting a moving object from an image captured by the camera, a stay information acquirer which acquires the stay information for each predetermined measurement period of time on the basis of the positional information of the moving object acquired by the moving object detector, a heat map image generator which generates the heat map image obtained by visualizing the stay information acquired by the stay information acquirer, a background image generator which generates a background image from the captured image, and a display image generator which generates a display image by superimposing the heat map image generated by the heat map image generator on the background image generated by the background image generator. The background image generator generates a digest image from a plurality of images captured during the measurement period of time corresponding to the stay information and uses the digest image as the background image.

Thereby, similarly to the fourth invention, since the digest image reflects a state of a target area covering the whole measurement period of time, the background image matches the heat map image by using the digest image as the background image. Therefore, it is possible to prevent a user from being given an uncomfortable feeling.

According to a thirteenth invention, there is provided a stay condition analyzing system that acquires stay information regarding a stay condition of a moving object within a target area, generates a heat map image obtained by visualizing the stay information, and displays the heat map image on a display device, the stay condition analyzing system including a camera which captures an image of the target area; and a plurality of information processing apparatuses. Any of the plurality of information processing apparatuses includes a moving object detector which acquires positional information by detecting a moving object from an image captured by the camera, a stay information acquirer which acquires the stay information for each predetermined measurement period of time on the basis of the positional information of the moving object acquired by the moving object detector, a heat map image generator which generates the heat map image obtained by visualizing the stay information acquired by the stay information acquirer, a background image generator which generates a background image from the captured image, and a display image generator which generates a display image by superimposing the heat map image generated by the heat map image generator on the background image generated by the background image generator. The background image generator includes a similarity calculator which calculates a similarity between the captured image and the stay information, and a background image selector which selects the captured image to be used as the background image on the basis of the similarity calculated by the similarity calculator.

Thereby, similarly to the eighth invention, a captured image having a high similarity to stay information serving as the origin of the heat map image is selected as a background image, and thus the background image matches the heat map image. Therefore, it is possible to prevent a user from being given an uncomfortable feeling.

According to a fourteenth invention, there is provided a stay condition analyzing method of causing an information processing apparatus to perform a process of acquiring stay information regarding a stay condition of a moving object within a target area, generating a heat map image obtained by visualizing the stay information, and displaying the heat map image on a display device, the stay condition analyzing method including, when a processor of the information processing apparatus executes an instruction stored in a memory, a step of acquiring the stay information for each predetermined measurement period of time on the basis of positional information of the moving object which is acquired from a captured image of the target area; a step of generating the heat map image obtained by visualizing the acquired stay information; a step of generating a background image from the captured image; and a step of generating a display image by superimposing the generated heat map image on the generated background image. In the step of generating the background image, the background image is generated by performing image processing for reducing discriminability of a moving object appearing in the captured image on the captured image.

Thereby, similarly to the first invention, a captured image is indiscriminately selected as a background image from the capture images within the measurement period of time. Accordingly, even when the background image and a heat map image do not match, it is possible to reduce an uncomfortable feeling given to a user.

According to a fifteenth invention, there is provided a stay condition analyzing method of causing an information processing apparatus to perform a process of acquiring stay information regarding a stay condition of a moving object within a target area, generating a heat map image obtained by visualizing the stay information, and displaying the heat map image on a display device, the stay condition analyzing method including a step of acquiring the stay information for each predetermined measurement period of time on the basis of positional information of the moving object which is acquired from a captured image of the target area; a step of generating the heat map image obtained by visualizing the acquired stay information; a step of generating a background image from the captured image; and a step of generating a display image by superimposing the generated heat map image on the generated background image. In the step of generating the background image, a digest image is generated from a plurality of images captured during the measurement period of time corresponding to the stay information, and the digest image is used as the background image.

Thereby, similarly to the fourth invention, since the digest image reflects a state of a target area covering the whole measurement period of time, the background image matches the heat map image by using the digest image as the background image. Therefore, it is possible to prevent a user from being given an uncomfortable feeling.

According to a sixteenth invention, there is provided a stay condition analyzing method of causing an information processing apparatus to perform a process of acquiring stay information regarding a stay condition of a moving object within a target area, generating a heat map image obtained by visualizing the stay information, and displaying the heat map image on a display device, the stay condition analyzing method including a step of acquiring the stay information for each predetermined measurement period of time on the basis of positional information of the moving object which is acquired from a captured image of the target area; a step of generating the heat map image obtained by visualizing the acquired stay information; a step of generating a background image from the captured image; and a step of generating a display image by superimposing the generated heat map image on the generated background image. The step of generating the background image includes a step of calculating a similarity between the captured image and the stay information, and a step of selecting the captured image to be used as the background image on the basis of the calculated similarity.

Thereby, similarly to the eighth invention, a captured image having a high similarity to stay information serving as the origin of the heat map image is selected as a background image, and thus the background image matches the heat map image. Therefore, it is possible to prevent a user from being given an uncomfortable feeling.

Hereinafter, exemplary embodiments of the invention will be described with reference to the accompanying drawings.

First Exemplary Embodiment

FIG. 1 is a configuration diagram showing the entire stay condition analyzing system according to a first exemplary embodiment. The stay condition analyzing system is constructed for a retail store such as a supermarket, and includes camera 1, recorder (video recording apparatus) 2, PC (stay condition analyzing apparatus) 3, and moving object detection device (moving object detector) 4. In the configuration shown in FIG. 1, camera 1, PC (stay condition analyzing apparatus) 3, and moving object detection device (moving object detector) 4 are shown separate devices. However, as recent cameras have higher functions, a camera having a moving object detection and tracking function (extraction of a traffic line, and the like) and a stay condition analyzing function (calculation of the number of counts, the number of stays, and the like in units of region blocks as stay information) has been developed, and thus it is also possible to provide a configuration in which the stay information is mainly transmitted directly to a PC and a server using such a camera. In this case, in the PC and the server, only a process of generating a heat map image, a drawing process capable of browsing using a display device, and the like are required to be performed by a dedicated application installed therein on the basis of the stay information transmitted from the camera, and thus it is possible to drastically reduce a load on data processing.

Camera 1 is installed at an appropriate location within a store, and a monitoring area within the store is imaged by camera 1. Image information obtained by the imaging is recorded in recorder 2.

Input device 6, such as a mouse, through which a user such as a monitoring person performs various input operations and monitor (display device) 7 that displays a monitoring screen are connected to PC 3. Input device 6 and monitor 7 may be constituted by a touch panel display.

PC 3 is installed in a security office or the like of a store, and a surveillant (security officer) can browse an image of the inside of the store which is captured by camera 1 in real time on a monitoring screen displayed on monitor 7 and can browse a past image of the inside of the store which is recorded in recorder 2.

A monitor not shown in the drawing is also connected to PC 11 provided in a head office, and thus the situations within the store can be confirmed in a head office by browsing an image of the inside of the store which is captured by camera 1 in real time and browsing a past image of the inside of the store which is recorded in recorder 2. PCs 3 and 11 include a processor (CPU) and a program memory. The CPU of PC 3 is realized by executing programs (instructions) for monitoring. These programs may be provided to a user by being recorded in an appropriate program recording medium as an application program operating on a general-purpose OS through a network, in addition to being introduced in advance into PC 3 as an information processing apparatus and configured as a dedicated device.

In moving object detection device 4, a person detection process that detects a person (moving object) from an image (frame) captured by camera 1 is performed, and positional information of a person for each imaging time of the captured image is output. The person detection process may use a well-known image recognition technique.

Figure 2:
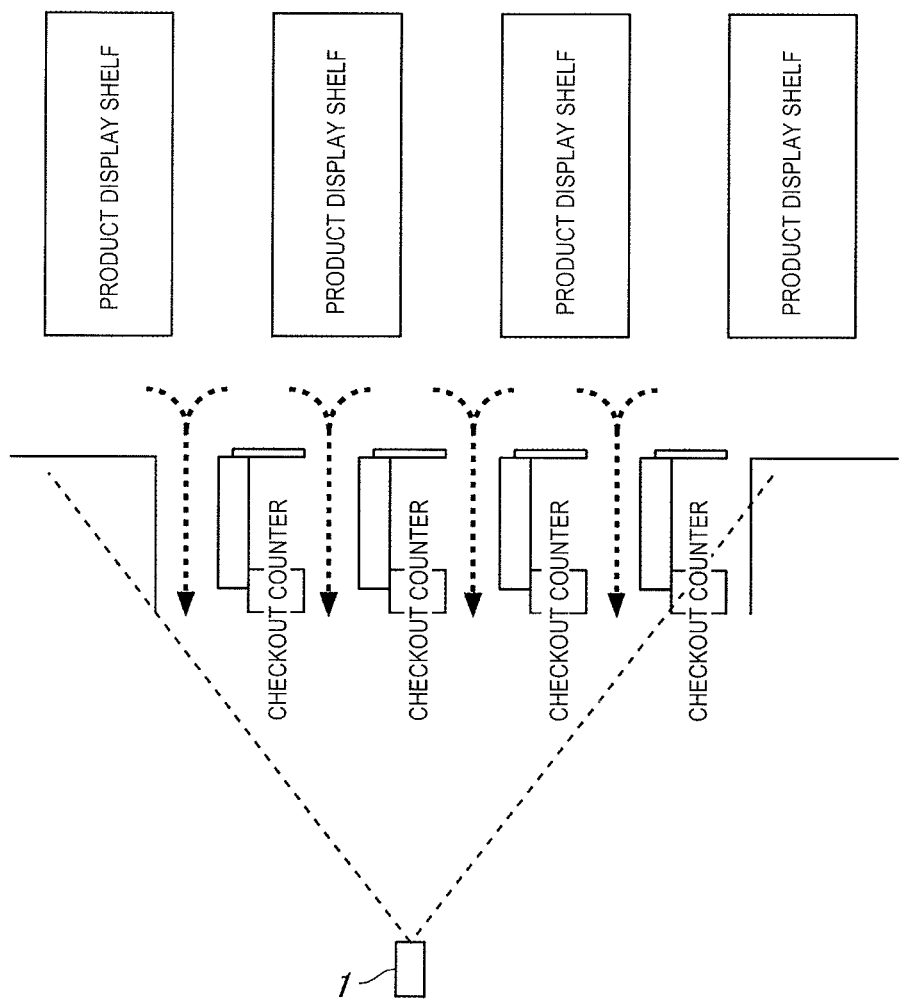
FIG. 2 is a plan view showing an installation condition of a camera in a store.

FIG. 2 is a plan view showing an installation condition of camera 1 in a store. Product display shelves and checkout counters are provided in the store. A customer obtains desired products in the product display shelves and performs accounting for the products in the checkout counter. At this time, the customer enters the checkout counter from the product display area side provided with the product display shelves, and leaves the checkout counter when the accounting is finished. Camera 1 is installed so as to image a customer entering the checkout counter from the front, and thus it is possible to detect a person from the image captured by camera 1.

Figure 3:
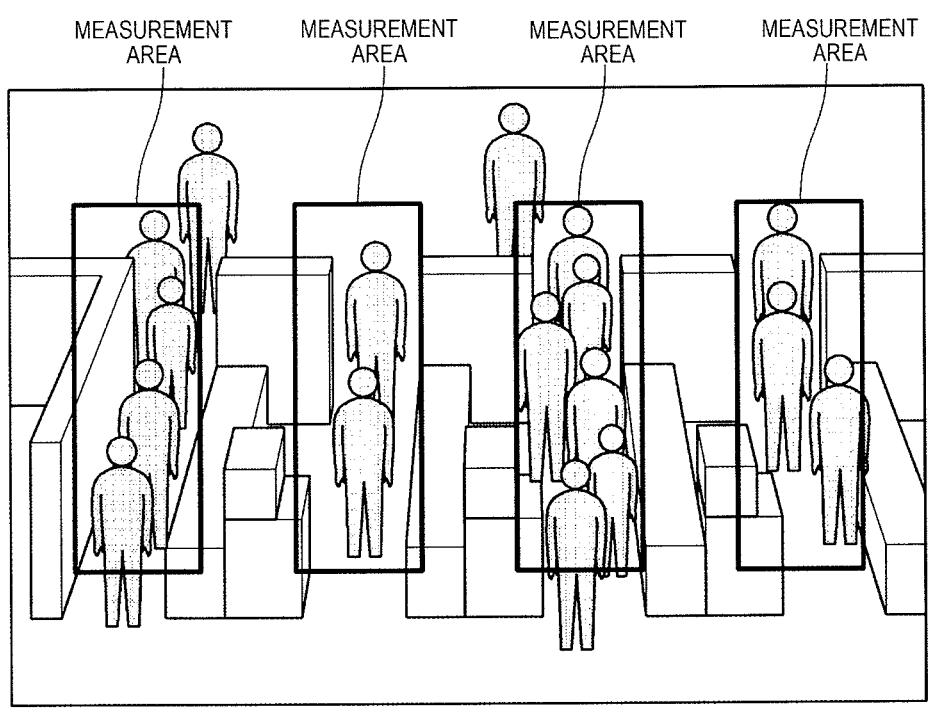
FIG. 3 is a diagram illustrating measurement areas which are set on an image captured by the camera.
Figure 4:
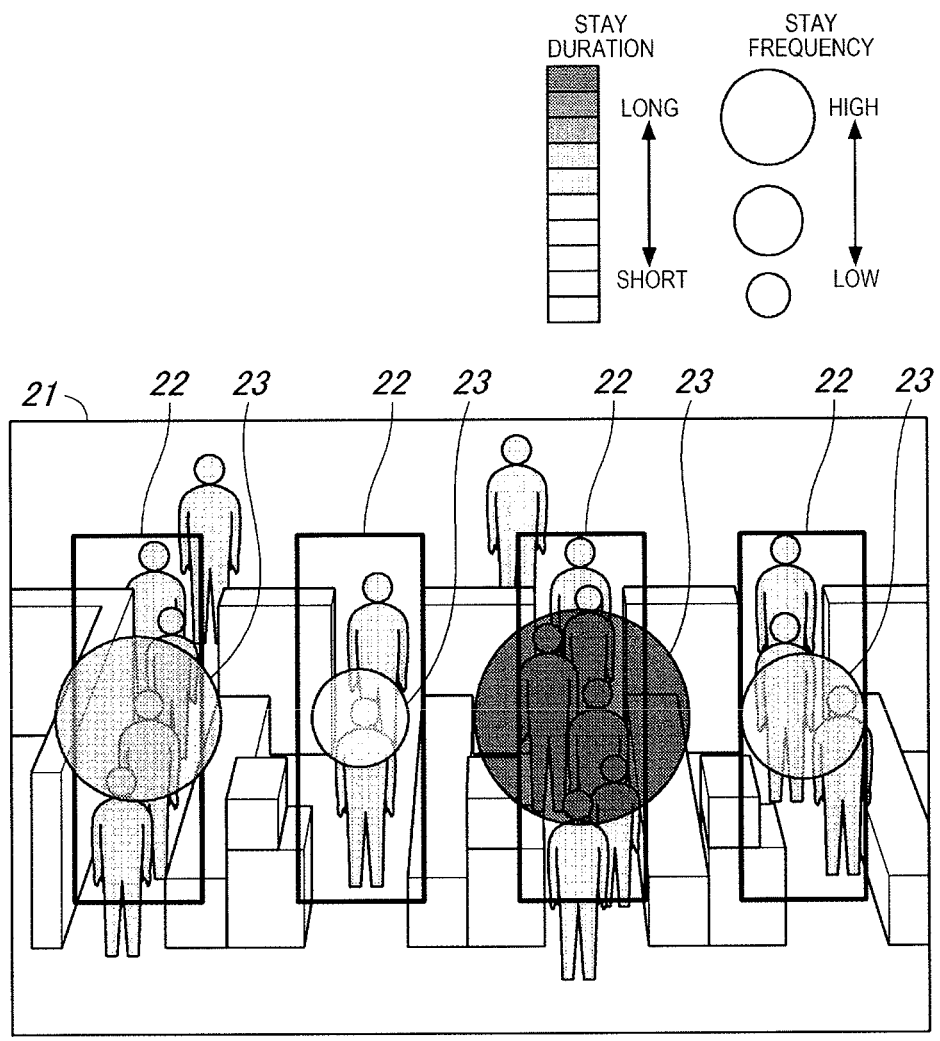
FIG. 4 is a diagram illustrating a display image which is generated by a PC and is displayed on a monitor.

Next, a heat map image generated through a stay condition analyzing process performed by PC 3 shown in FIG. 1 will be described. FIG. 3 is a diagram illustrating measurement areas which are set on an image captured by camera 1 shown in FIG. 2. FIG. 4 is a diagram illustrating a display image which is generated by PC 3 shown in FIG. 1 and is displayed on monitor 7.

As shown in FIG. 3, person performing accounting at a checkout counter are shown in the image captured by camera 1, and the persons enter the checkout counter from an entrance side, that is, the back side distant from camera 1 and leave from an exit side, that is, the front side close to camera 1. A flow of persons directed toward the exit side from the entrance side is generated in the vicinity of the checkout counter. However, when the accounting operation at the checkout counter is delayed or the number of customers exceeds the working capacity of a store clerk, a queue for accounting is formed, which leads to a state where the persons stay.

In the present exemplary embodiment, a measurement area is set in a region where persons move in the vicinity of a checkout counter in order to ascertain a stay condition of a person in the vicinity of the checkout counter, stay information regarding the stay condition of a person within the measurement area (target area), specifically, a stay degree (the number of staying persons), that is, the number of persons staying within the target area, and a stay duration, that is, the time for which the persons stay within the measurement area are acquired, and a heat map image obtained by visualizing the stay information is generated.

In the example shown in FIG. 4, frame image 22 showing a measurement area and heat map image 23 showing stay information (a stay degree and a stay duration) are superimposed on background image 21 generated from the image captured by camera 1 in a see-through state and are displayed. Heat map images 23 are displayed side by side for every plurality of measurement areas.

In heat map image 23, the level of a numerical value of stay information is expressed by at least one of properties of an image, that is, a size, a color tone (hue), and the density (concentration) of a color. In particular, in the example shown in FIG. 4, the stay duration is expressed by the density of a paint-out color of heat map image 23 having a circular shape, and the stay degree (the number of staying persons) is expressed by the size of heat map image 23. The longer the stay duration is, the darker the color of heat map image 23 becomes. In addition, the higher the stay degree is, the larger the size of heat map image 23 becomes.

Figure 5:
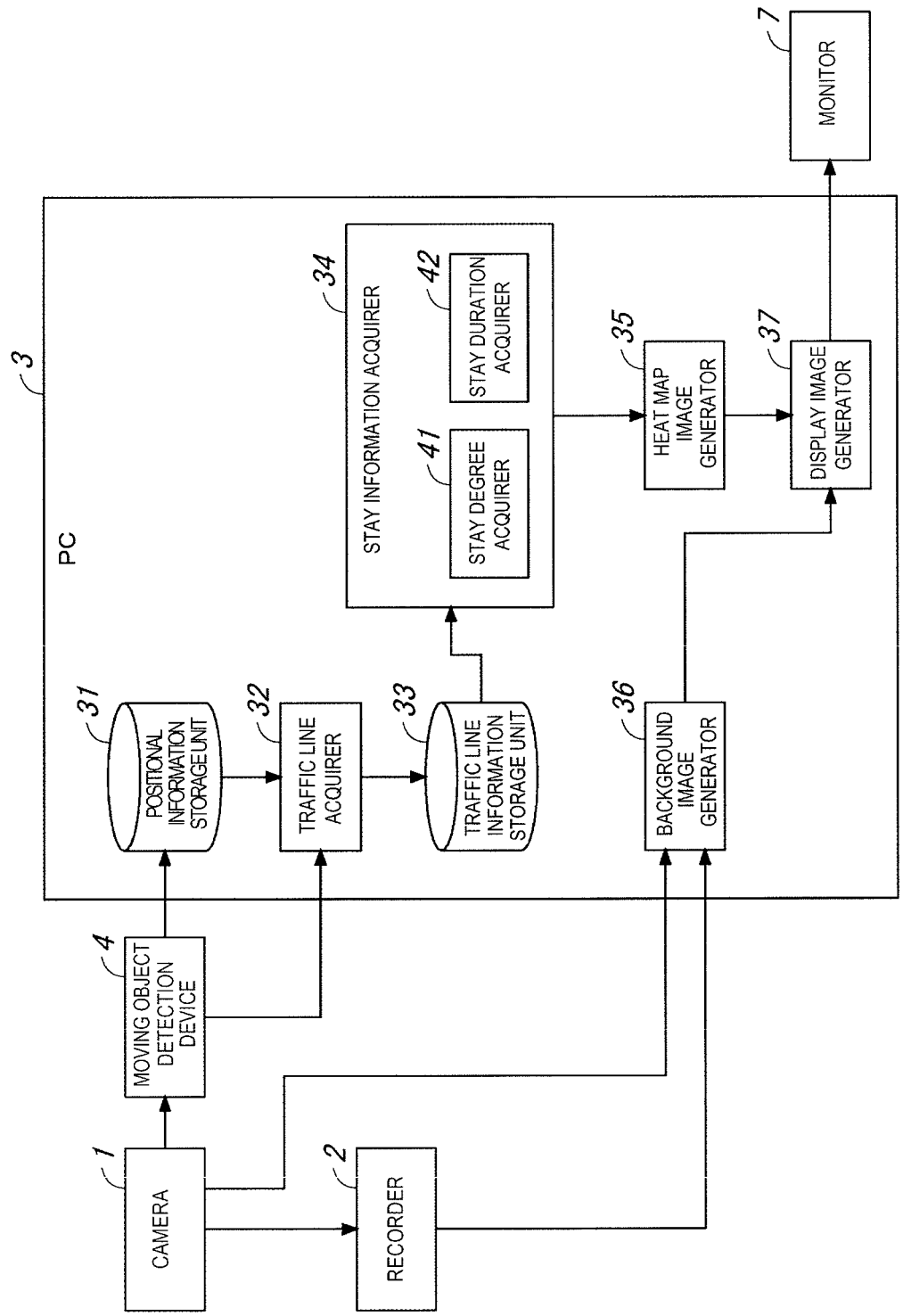
FIG. 5 is a functional block diagram showing a schematic configuration of the PC.

Next, a stay condition analyzing process performed by PC 3 shown in FIG. 1 will be described. FIG. 5 is a functional block diagram showing a schematic configuration of PC 3.

PC 3 includes positional information storage unit 31, traffic line acquirer 32, traffic line information storage unit 33, stay information acquirer 34, heat map image generator 35, background image generator 36, and display image generator 37.

Positional information storage unit 31 stores positional information for each person which is acquired from moving object detection device 4. The positional information includes information regarding a detection position for each person detected from an image (each frame of an image) which is captured by camera 1, a detection time for each person which is acquired from an imaging time of a captured image in which a person is detected, and the like.

Traffic line acquirer 32 performs a process of acquiring a traffic line for each person detected from an image captured by camera 1. The traffic line acquisition process is performed on the basis of positional information for each person which is generated by moving object detection device 4 and is stored in positional information storage unit 31. The information regarding the traffic line for each person which is acquired by traffic line acquirer 32 is stored in traffic line information storage unit 33.

Stay information acquirer 34 acquires stay information regarding a stay condition of a person within a measurement area for each predetermined measurement period of time, on the basis of the traffic line information stored in traffic line information storage unit 33, and includes stay degree acquirer 41 and stay duration acquirer 42.

Stay degree acquirer 41 performs a process of acquiring a stay degree (the number of staying persons) for each measurement area on the basis of traffic line information for each person which is acquired by traffic line acquirer 32. In this process, a stay degree for each measurement area during a measurement period of time is obtained by counting the number of traffic lines having passed through the measurement area during the measurement period of time.

Stay duration acquirer 42 performs a process of acquiring a stay duration within a measurement area for each person on the basis of the traffic line information for each person which is acquired by traffic line acquirer 32. In this process, first, a stay duration for each person is acquired from a stay time (an entrance time and a leaving time with respect to a measurement area) for each person within a measurement period of time, and then a stay duration for each measurement area is acquired through an appropriate statistical process such as averaging from the stay duration for each person.

Heat map image generator 35 performs a process of generating a heat map image, obtained by visualizing the stay information (a stay degree and a stay duration) which is acquired by stay information acquirer 34, for each measurement period of time.

Background image generator 36 performs a process of generating a background image by selecting one captured image from a plurality of images captured during a measurement period of time and by performing image processing on the selected captured image. In the present exemplary embodiment, a process of generating a background image by performing image processing for reducing the discriminability of a person appearing in a captured image on the entire captured image is performed.

Display image generator 37 performs a process of generating a display image by superimposing the heat map image generated by heat map image generator 35 on the background image generated by background image generator 36.

Each of the units shown in FIG. 5 is realized by the CPU of PC 3 which executes a program for analyzing a stay condition. This program may be provided to a user by being recorded in an appropriate program recording medium as an application program operating on a general-purpose OS through a network, in addition to being introduced in advance into PC 3 as an information processing apparatus and configured as a dedicated device.

Figure 6:
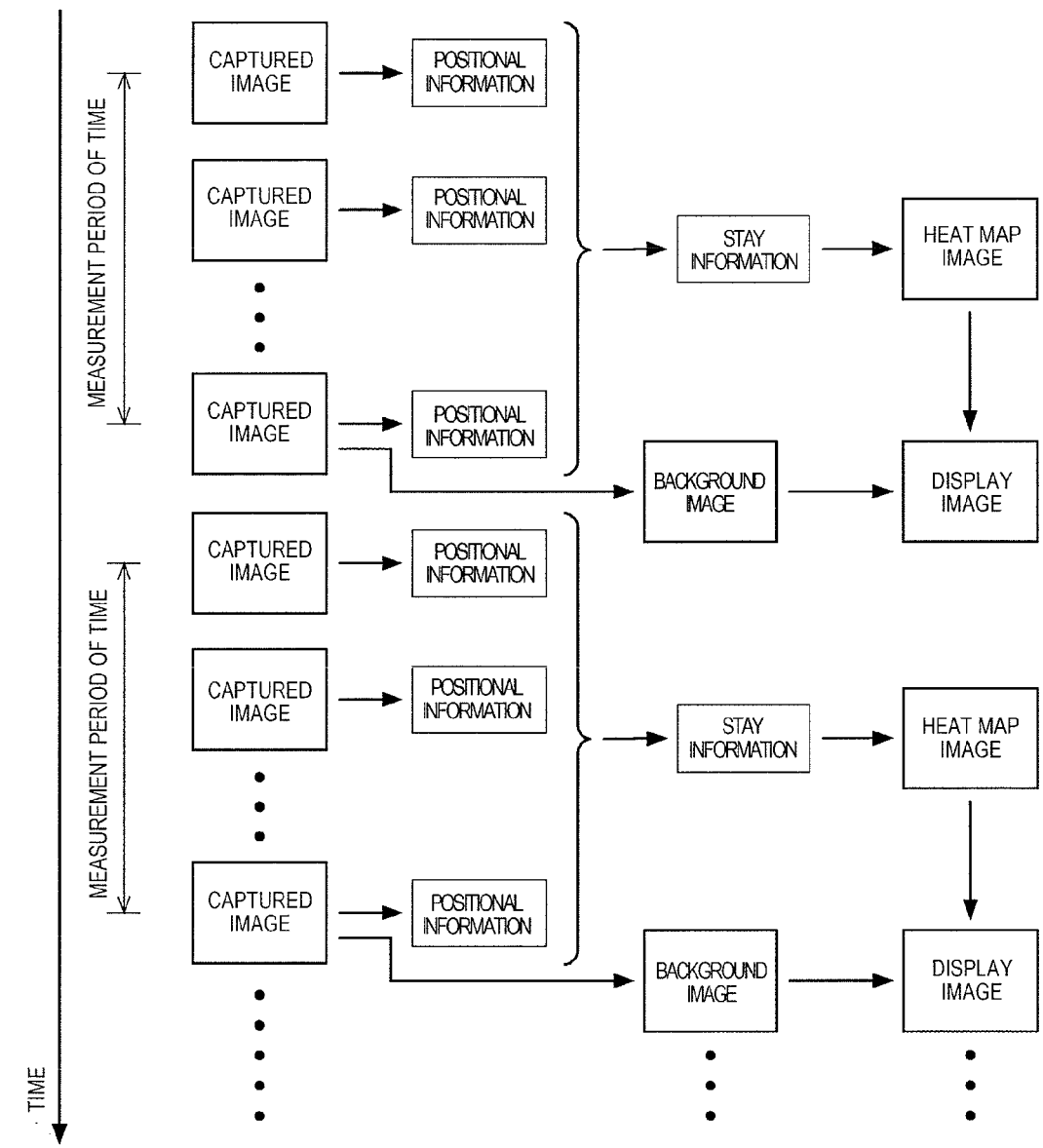
FIG. 6 is a diagram illustrating an outline of a background image generation process performed by a background image generator.

Next, a process performed by background image generator 36 shown in FIG. 5 will be described. FIG. 6 is a diagram illustrating an outline of a background image generation process performed by background image generator 36.

In the present exemplary embodiment, as described above, moving object detection device 4 performs a process of acquiring positional information by detecting a perform from a captured image (frame) at each time, traffic line acquirer 32 performs a process of acquiring a traffic line for each person from positional information at each time, stay information acquirer 34 performs a process of acquiring stay information (a stay degree and a stay duration) on the basis of traffic line information for a predetermined measurement period of time (for example, 30 minutes), and heat map image generator 35 performs a process of generating a heat map image from stay information.

On the other hand, background image generator 36 performs a process of generating a background image by indiscriminately selecting one captured image from a plurality of images captured for a predetermined measurement period of time and by performing image processing on the selected captured image. In the example shown in FIG. 6, a captured image at a point in time of the termination of the measurement period of time is selected, and a background image is generated from the captured image. Display image generator 37 performs a process of generating a display image by superimposing a heat map image on a background image.

Figure 7A:
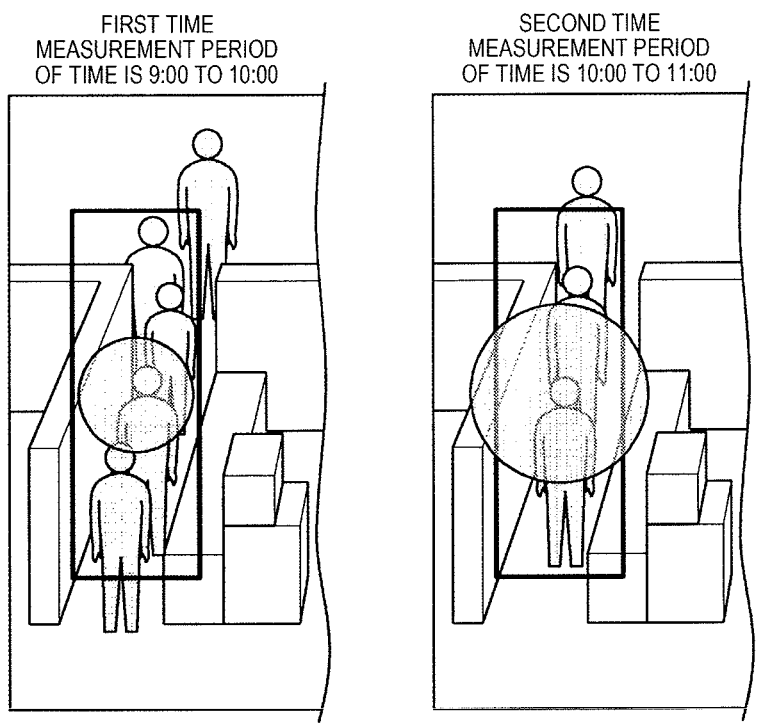
FIGS. 7A and 7B are diagrams illustrating an example in which a background image and a heat map image do not match.
Figure 7B:
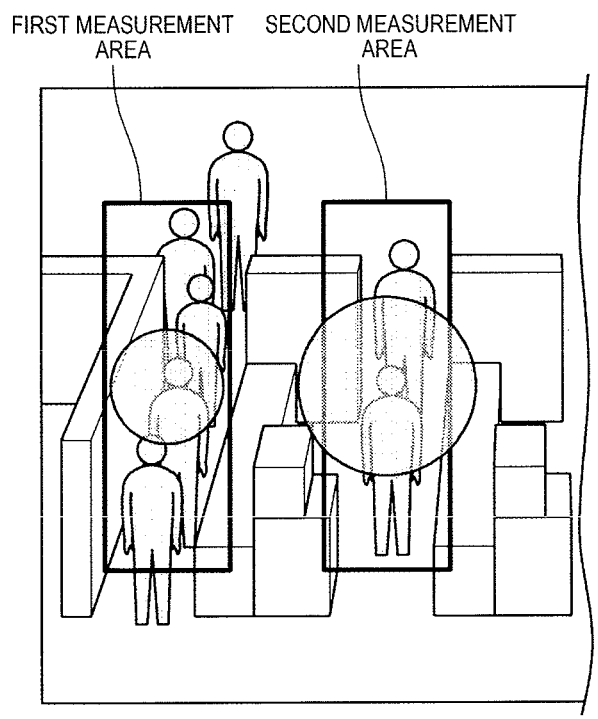

Here, an example in which a background image and a heat map image do not match will be described. FIGS. 7A and 7B are diagrams illustrating an example in which a background image and a heat map image do not match.

When a captured image, such as a captured image at a point in time of the termination of a measurement period of time, which is to be used as a background image is indiscriminately selected from a plurality of captured images during the measurement period of time, the background image is a captured image at a certain point in time, whereas a heat map image is an image generated from captured images at a plurality of times within a measurement period of time. For this reason, the background image and the heat map image do not match, that is, a stay state of an actual person shown in the background image and a stay state shown in the heat map image may be greatly different from each other. In this case, a user may be given an uncomfortable feeling.

Here, there are two cases shown in FIGS. 7A and 7B as a case where a background image and a heat map image do not match.

The case shown in FIG. 7A is a case where a background image and a heat map image in one measurement area do not match temporally. In the example shown in FIG. 7A, comparing a display image at a first time (a measurement period of time is 9:00 to 10:00) and a display image at the subsequent second time (a measurement period of time is 10:00 to 11:00), a stay degree, that is, the degree of congestion is higher at the subsequent second time than at the first time in the heat map image, while more persons are shown at the first time than at the subsequent second time in the background image. Accordingly, the background image and the heat map image do not match.

The case shown in FIG. 7B is a case where a background image and a heat map image in a display image at a certain time do not match in two measurement areas. In the example shown in FIG. 7B, a stay degree, that is, the degree of congestion is higher in a second measurement area than in a first measurement area in the heat map image, while more persons are shown in the first measurement area than in the second measurement area. Accordingly, the background image and the heat map image do not match.

Consequently, in the present exemplary embodiment, an uncomfortable feeling given to a user is reduced by a background image and a heat map image which do not match. For this reason, as shown below, a background image is generated by performing image processing on a captured image which is indiscriminately selected from a plurality of images captured during a measurement period of time.

Figure 8A:
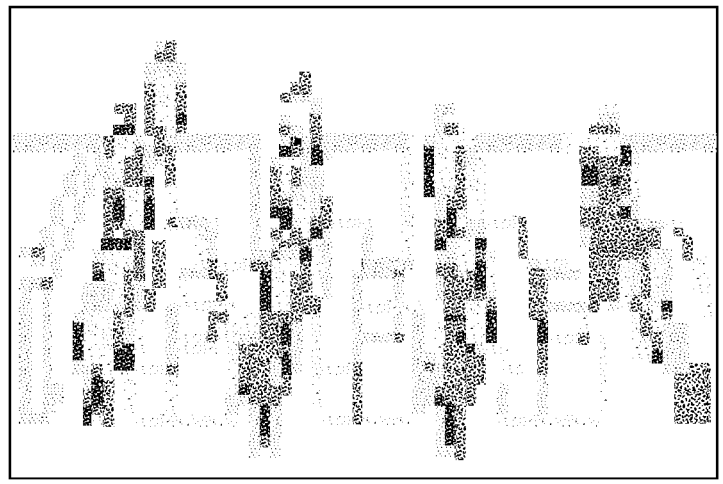
FIG. 8A is a diagram illustrating a background image which is generated by the background image generator.

Next, a background image generation process performed by background image generator 36 shown in FIG. 5 will be described. FIGS. 8A and 9A are diagrams showing a background image generated by background image generator 36, and FIGS. 8B and 9B are diagrams showing a display image generated by display image generator 37.

Background image generator 36 performs a process of generating a background image by performing image processing for reducing the discriminability (visibility) of a person appearing in a captured image on the entire captured image, and background images shown in FIGS. 8A and 9A are generated. Display image generator 37 performs a process of generating a display image by superimposing a heat map image on a background image generated by background image generator 36, and thus display images shown in FIGS. 8B and 9B are generated.

Figure 8B:
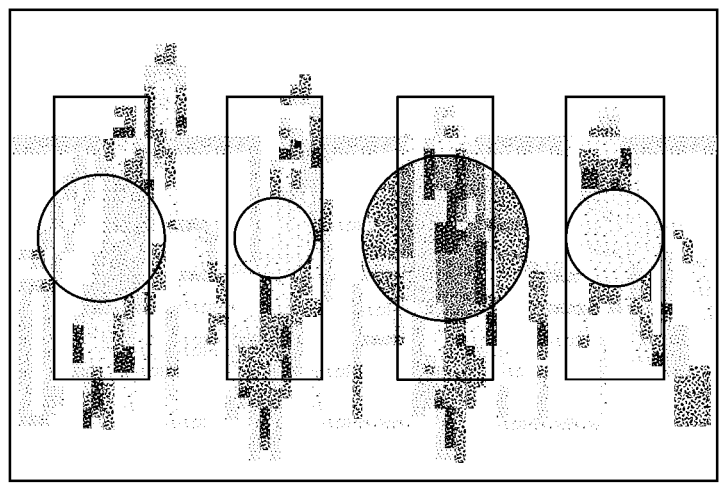
FIG. 8B is a diagram illustrating a display image which is generated by a display image generator.
Figure 9A:
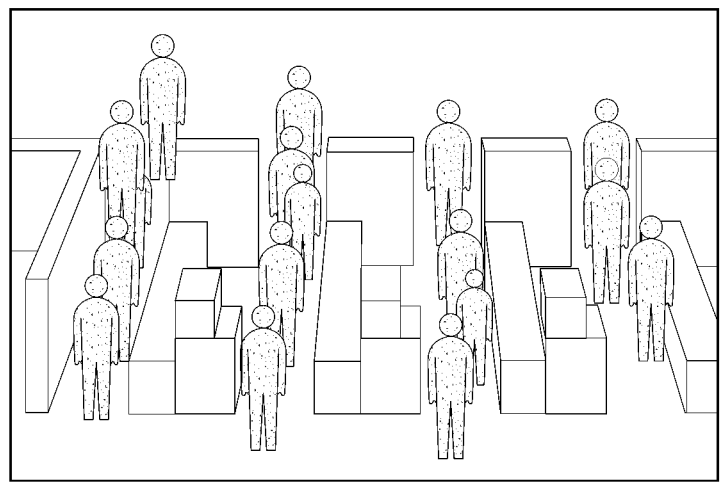
FIG. 9A is a diagram illustrating a background image which is generated by the background image generator.
Figure 9B:
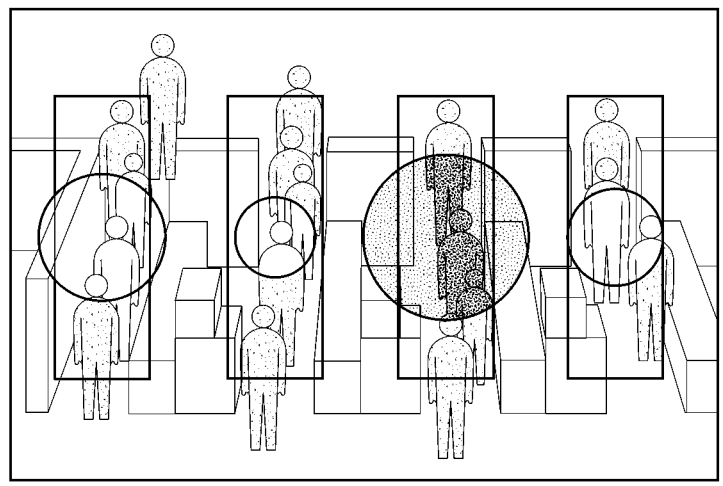
FIG. 9B is a diagram illustrating a display image which is generated by the display image generator.

The examples shown in FIGS. 8A and 8B show a case where blurring processing, particularly, mosaic processing, that is, a process of dividing a captured image into a plurality of blocks is performed on a captured image as image processing of reducing the discriminability of a person appearing in the captured image and a process of replacing pixel values of all pixels within a block with a single pixel value such as a pixel value of one pixel within the block or an average value of pixel values of pixels within the block is performed. The examples shown in FIGS. 9A and 9B show a case where a process of superimposing a monochromic semitransparent image on a captured image is performed.

In addition to the mosaic processing, various types of filtering processing using, for example, a blur filter, a Gaussian filter, a median filter, and a bilateral filter can also be performed as the blurring processing. Further, in order to reduce the discriminability of a person appearing in a captured image, it is also possible to use various types of image processing such as gray scale conversion, negative-positive inversion, color tone correction (brightness change, RGB color balance change, contrast change, gamma correction, color saturation adjustment, and the like), binarization, and edge filtering.

As described above, in the present exemplary embodiment, background image generator 36 generates a background image by performing image processing for reducing the discriminability (visibility) of a person appearing in a captured image on the entire captured image, and the person shown in the captured image is not likely to be identified in the background image on which such image processing is performed. For this reason, for example, a captured image at a point in time of the termination of a measurement period of time, among capture images within the measurement period of time, is indiscriminately selected as a background image. Accordingly, even when the background image and a heat map image do not match, it is possible to reduce an uncomfortable feeling given to a user.

Particularly, in the present exemplary embodiment, as image processing for reducing the discriminability of a person appearing in a captured image, blurring processing or a process of superimposing a transparent single color is performed on the entire captured image. For this reason, it is difficult to know an exact number of persons, position, and the like while maintaining a state capable of roughly ascertaining an overview of a target area, that is, where and what it is. Therefore, it is possible to reduce an uncomfortable feeling due to mismatch between a background image and a heat map image.

In the present exemplary embodiment, image processing for reducing the discriminability of a person appearing in a captured image is performed on the entire captured image. However, image processing may be performed on a portion of a captured image, particularly, on only a region where a person passes through.

Second Exemplary Embodiment

Next, a second exemplary embodiment will be described. The facts that are not particularly mentioned herein are the same as those in the first exemplary embodiment.

Figure 10:
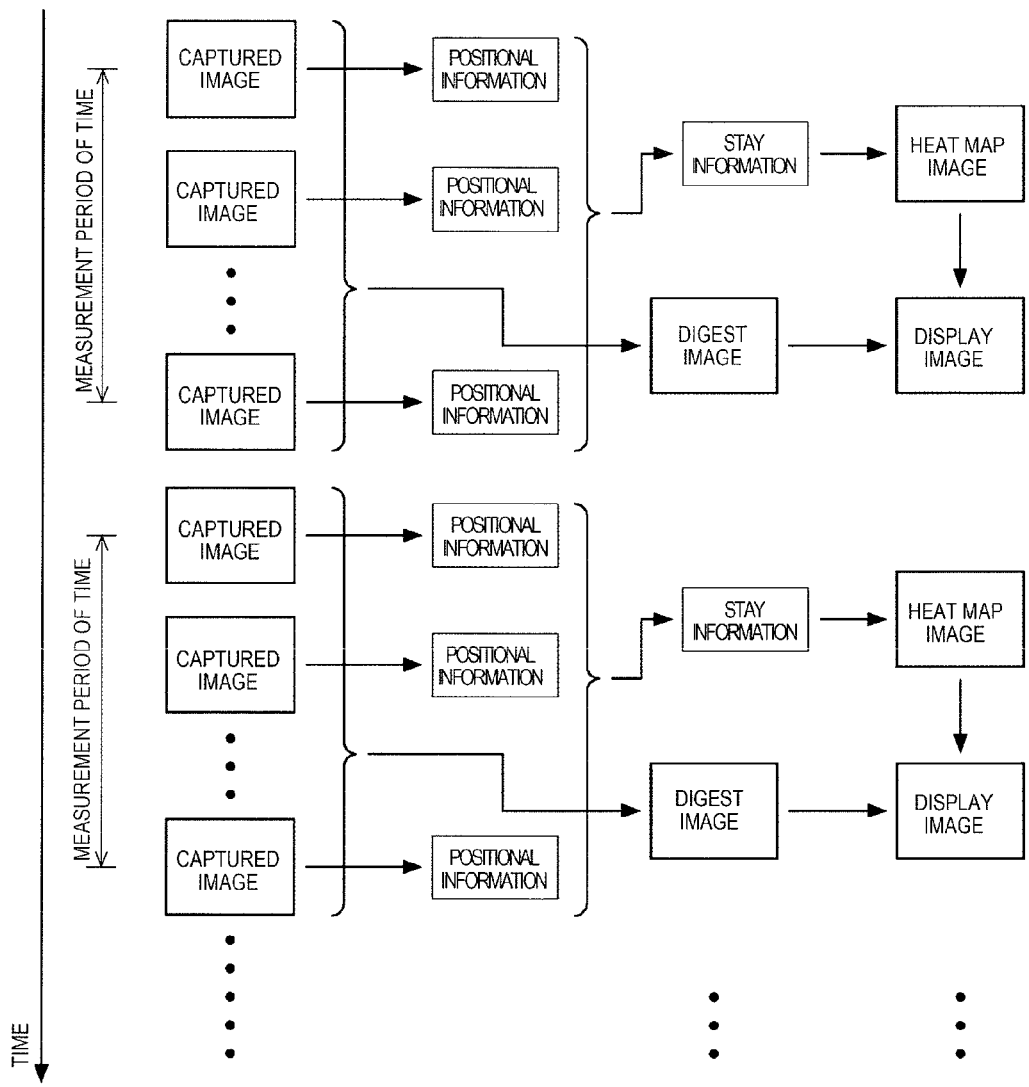
FIG. 10 is a diagram illustrating an outline of a background image generation process performed by a background image generator of a PC according to a second exemplary embodiment.
Figure 11A:
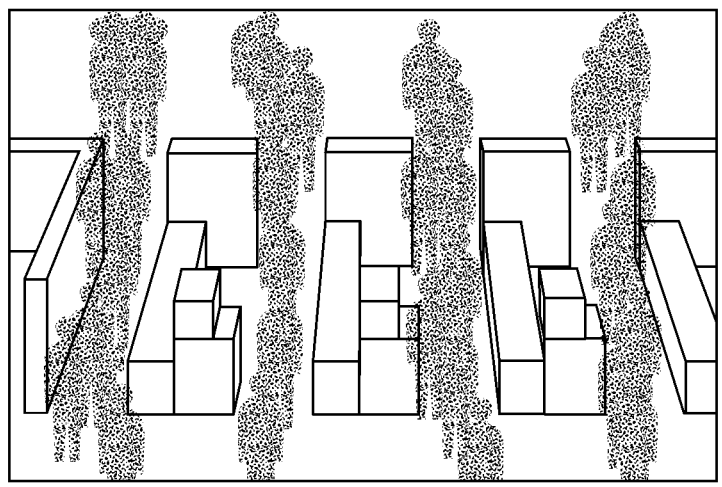
FIG. 11A is a diagram illustrating a background image which is generated by the background image generator.
Figure 11B:
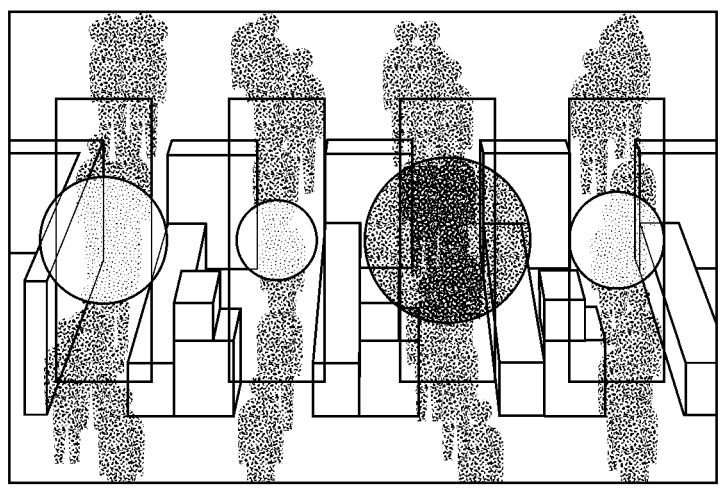
FIG. 11B is a diagram illustrating a display image which is generated by a display image generator.
Figure 12A:
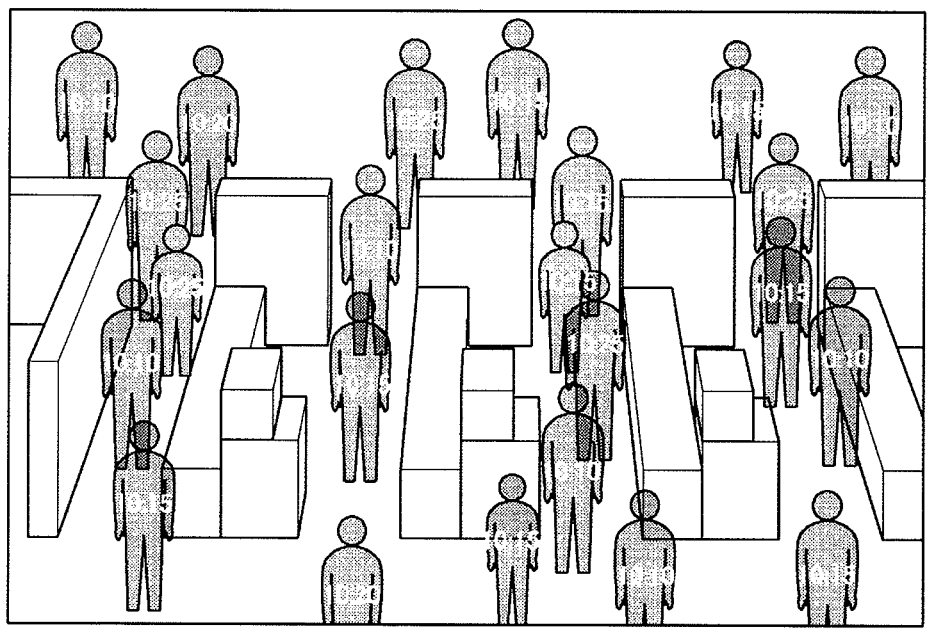
FIG. 12A is a diagram illustrating a background image which is generated by the background image generator.
Figure 12B:
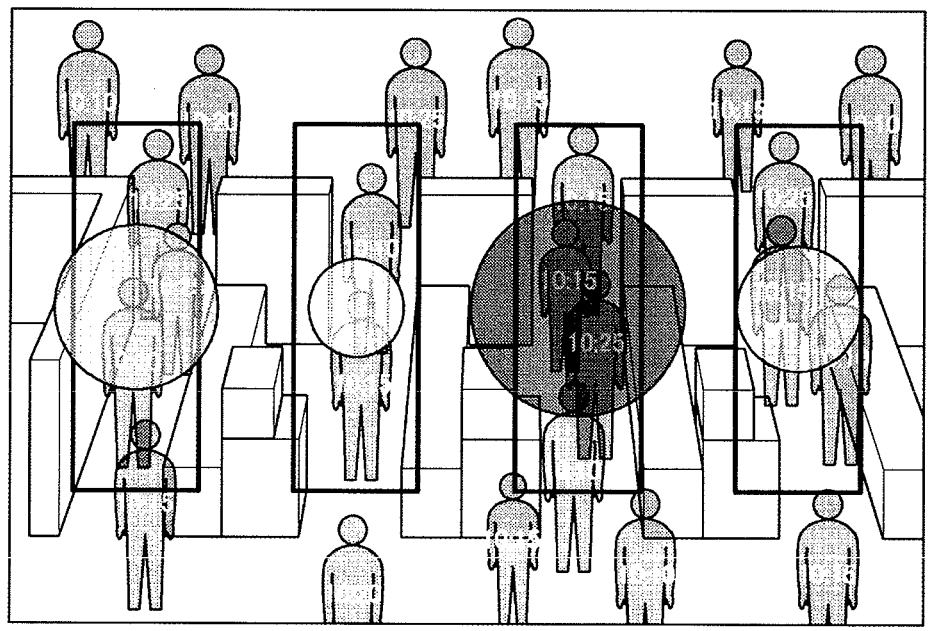
FIG. 12B is a diagram illustrating a display image which is generated by the display image generator.

FIG. 10 is a diagram illustrating an outline of a background image generation process performed by background image generator 36 of PC 3 according to a second exemplary embodiment. FIGS. 11A and 12A are diagrams illustrating a background image generated by background image generator 36, and FIGS. 11B and 12B are diagrams illustrating a display image generated by display image generator 37.

In the second exemplary embodiment, as shown in FIG. 10, background image generator 36 performs a process of generating a digest image from a plurality of images captured during a measurement period of time corresponding to stay information and using the digest image as a background image. When the digest image is generated, a plurality of captured images may be selected at regular intervals from captured images within a measurement period of time, in addition to using all the captured images within the measurement period of time as targets.

Particularly, in the second exemplary embodiment, background image generator 36 performs a process of generating an average image as a digest image by obtaining an average value of pixel values (for example, luminance values) in a plurality of captured images for each pixel and using the average value as a pixel value, and using the average image as a background image. Background image generator 36 performs a process of obtaining a variance of a pixel value (for example, a luminance value) in a plurality of captured images for each pixel, generating a variance image, as a digest image, using the variance as a pixel value, and using the variance image as a background image. Accordingly, a background image shown in FIG. 11A is generated. Display image generator 37 performs a process of superimposing a heat map image on a background image generated by background image generator 36, and thus a display image shown in FIG. 11B is generated.

In the average image, a background portion through which a person does not pass is influenced by noise, fluctuating sunshine, or the like, but is maintained in a generally clear state, and an image of a static object such as a checkout counter appears clearly. On the other hand, a portion through which a person passes is in an unclear state, and thus an image looking like a person appears, but the image of the person becomes unclear. In particular, the image of a person appears clearly in a portion in which the person stays for a long time. However, a portion through which a small number of persons pass becomes an image close to a background, and the image of a person becomes unclear in a portion through which a large number of persons pass.

In a variance image, when a portion having a small variance value is displayed as a black color, for example, in a black and white display, a background portion through which a person does not pass is influenced by noise, fluctuating sunshine, or the like but has a variance of approximately 0, and thus is displayed as a color close to black. On the other hand, a portion through which a person passes is in an unclear state. In particular, since there is little change in luminance in a portion through which a small number of persons pass and a portion in which a person stays for a long time, the portions are displayed as a color close to black, similar to the background. An unclear image looking like a person appears in a portion through which a large number of persons pass.

In the second exemplary embodiment, background image generator 36 performs a process of generating a digest image, obtained by superimposing an image of a person extracted from each of a plurality of captured images during a measurement period of time on one captured image, and using the digest image as a background image. Accordingly, a background image shown in FIG. 12A is generated. Display image generator 37 performs a process of superimposing a heat map image on the background image generated by background image generator 36, and thus a display image shown in FIG. 12B is generated.

In the example shown in FIG. 12, a time is displayed in a portion of an image of a person within a background image (digest image). This time is an imaging time of a captured image from which the image of the person is extracted, that is, a time when the person appears in the captured image. A configuration in which a time is not displayed may be adopted.

When a digest image is generated, a captured image at a point in time of the termination of a measurement period of time is used as a captured image for a background on which an image of a person is superimposed, but an image obtained by removing an image of a person from a captured image may be used. In this case, for example, an image of a person is removed from each of a plurality of images recently captured, and a captured image for a background may be synthesized from the plurality of captured images. A captured image when a person is not present, for example, a captured image before a store is opened may be prepared in advance as a captured image for a background.

A digest image may be displayed as a still image, that is, images of a plurality of persons appearing in a captured image within a measurement period of time may be simultaneously superimposed on a captured image for a background to thereby generate one digest image. However, a digest image may be displayed as a moving image, that is, images of persons appearing in a captured image within a measurement period of time may be displayed in the order of appearance times of the persons.

Since the position of an image of a person is changed due to the movement of the person appearing in a captured image, the problem is at which timing an image of a person to be superimposed on a captured image for a background is set. For example, an image of a person at a central time during a person appearance period may be used. In addition, in order to prevent a background image from being difficult to see, an image of a person may be selected so that images of a plurality of persons are distributed as much as possible and are disposed at locations that do not excessively overlap each other.

As described above, in the present exemplary embodiment, background image generator 36 generates a digest image from a plurality of images captured during a measurement period of time corresponding to stay information and uses the digest image as a background image. Since such a digest image reflects a state of a target area covering the whole measurement period of time, the background image matches a heat map image. Therefore, it is possible to prevent a user from being given an uncomfortable feeling.

Particularly, in the present exemplary embodiment, an average image or a variance image is used as a background image. In the average image or the variance image, an image of a person becomes unclear, but an image of a static object is maintained in a relatively clear state. Thus, it is possible to obviously ascertain the state of a target area other than the person. In the average image or the variance image, an image looking like a person appears in a region where a person is actually present. Since the average image or the variance image reflects the state of a target area covering the whole measurement period of time, an image looking like a person appearing in the average image or the variance image matches a heat map image. Accordingly, it is possible to prevent a user from being given an uncomfortable feeling.

In the present exemplary embodiment, a digest image obtained by superimposing an image of a person extracted from each of a plurality of captured images within a measurement period of time on one captured image is used as a background image. In such a digest image, the images of the persons appearing in the captured images within a measurement period of time are clearly displayed, and an image of an object other than the persons is also clearly displayed. Accordingly, it is possible to obviously ascertain the state of a target area including the person.

Third Exemplary Embodiment

Next, a third exemplary embodiment will be described. The facts that are not particularly mentioned herein are the same as those in the first exemplary embodiment.

Figure 13:
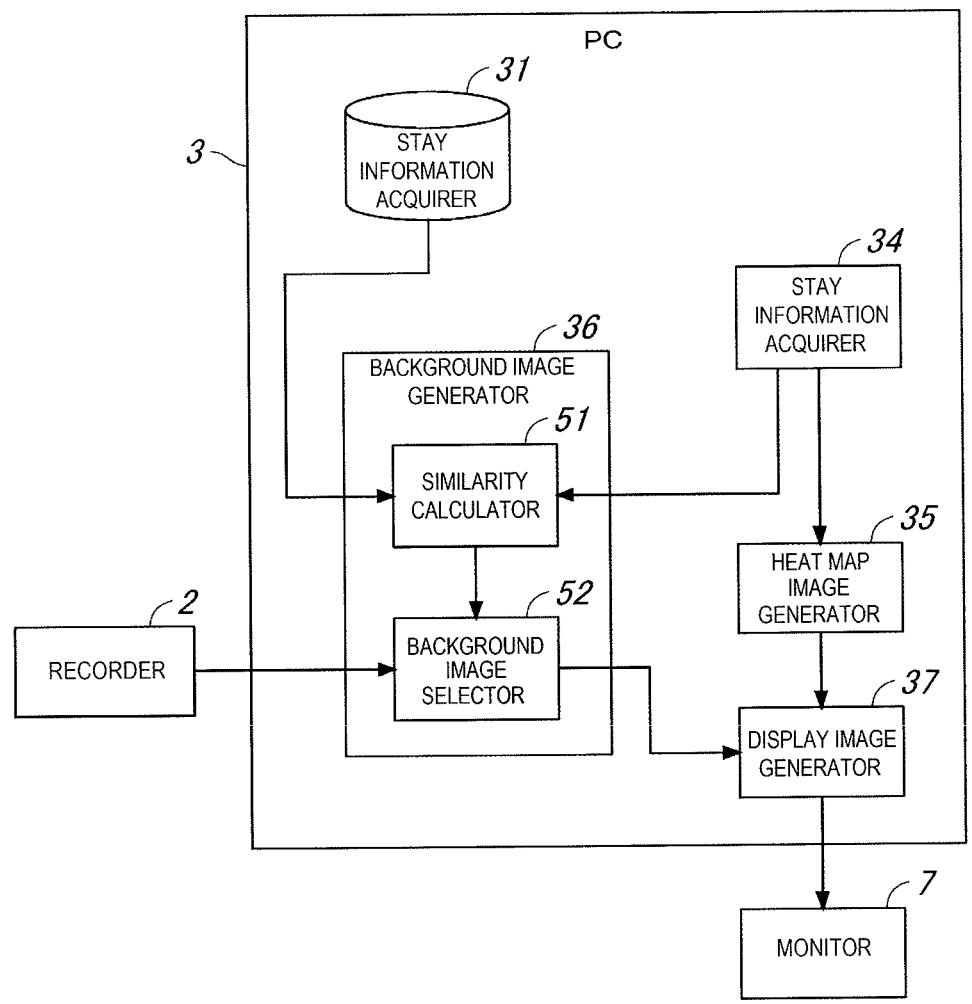
FIG. 13 is a functional block diagram showing a schematic configuration of a PC according to a third exemplary embodiment.
Figure 14:
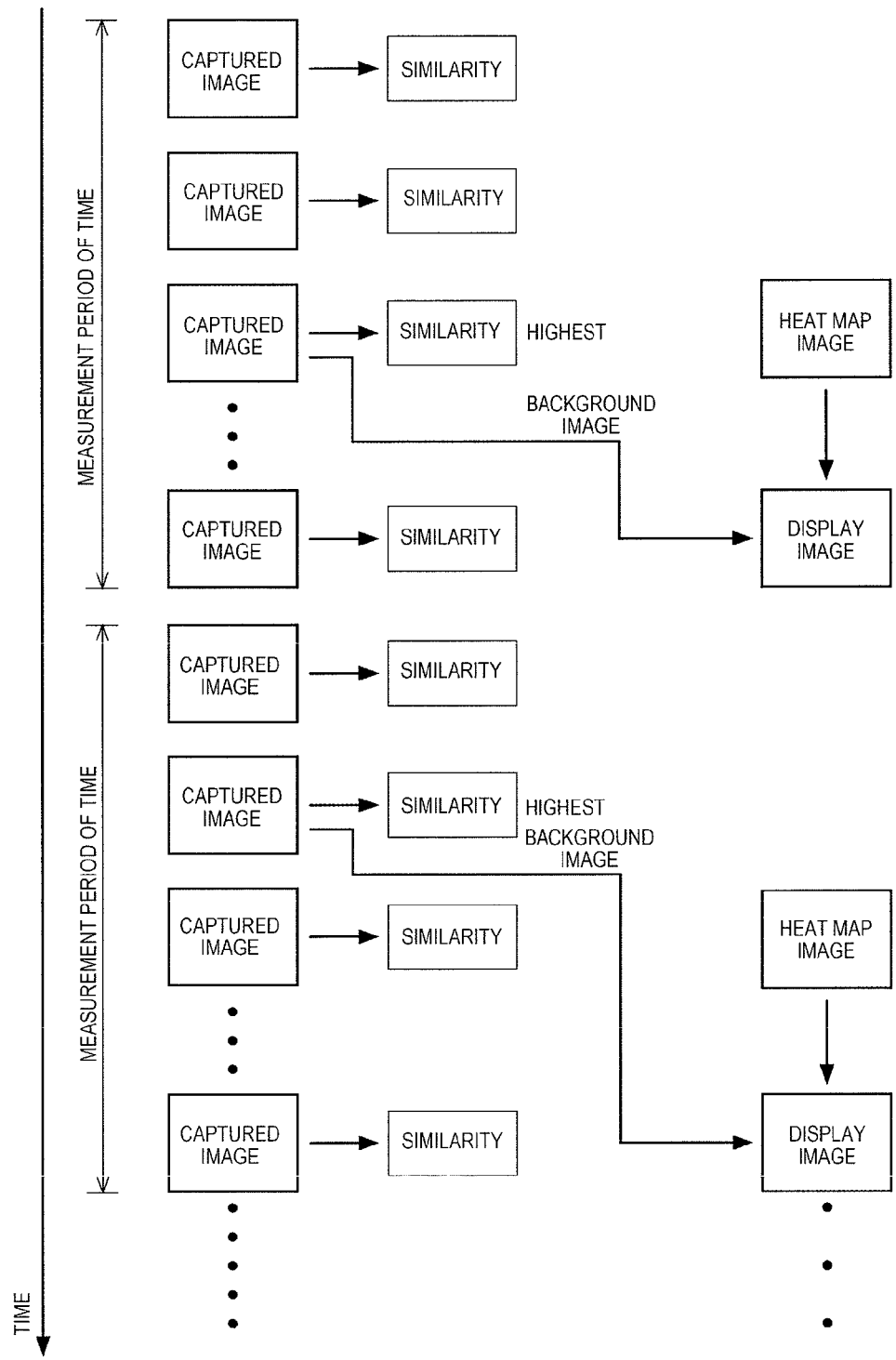
FIG. 14 is a diagram illustrating an outline of a background image generation process performed by a background image generator.
Figure 15A:
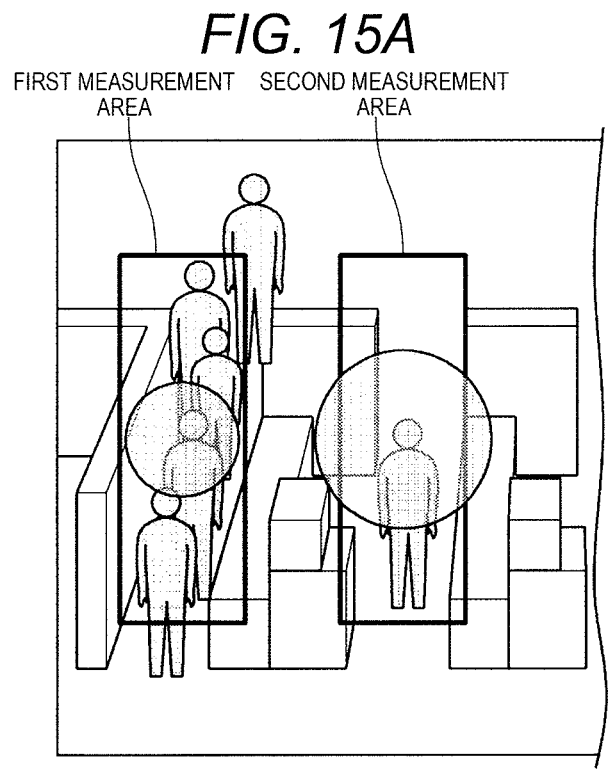
FIGS. 15A and 15B are diagrams illustrating an outline of a similarity calculation process performed by a similarity calculator.
Figure 15B:
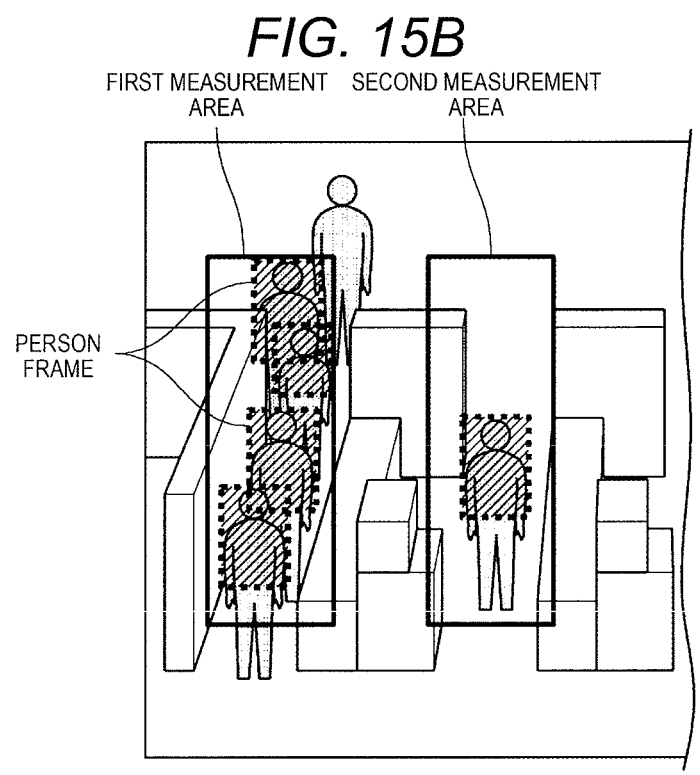

FIG. 13 is a functional block diagram showing a schematic configuration of PC 3 according to the third exemplary embodiment. FIG. 14 is a diagram illustrating an outline of a background image generation process performed by background image generator 36 shown in FIG. 13. FIGS. 15A and 15B are diagrams illustrating an outline of a similarity calculation process performed by similarity calculator 51 shown in FIG. 13.

In the first exemplary embodiment and the second exemplary embodiment, background image generator 36 generates a background image by performing appropriate image processing on a captured image. However, in the third exemplary embodiment, a process of searching for an appropriate captured image as a background image is performed, and image processing is not performed. Particularly, in the third exemplary embodiment, as shown in FIG. 14, similarities between captured images at respective times within a measurement period of time of stay information are calculated, and a captured image having the highest similarity is selected as a background image.

As shown in FIG. 13, background image generator 36 includes similarity calculator 51 and background image selector 52. Similarity calculator 51 performs a process of calculating similarities between captured images at respective times and stay information acquired by stay information acquirer 34 on the captured images at the respective times within a measurement period of time of stay information by comparing positional information obtained from the captured images and the stay information. Background image selector 52 performs a process of selecting a captured image having the highest similarity from the captured images at the respective times within the measurement period of time of stay information, as a background image, on the basis of the similarities calculated by similarity calculator 51.

Similarity calculator 51 calculates a similarity between a captured image and stay information by acquiring information of a person frame for each person included in positional information stored in positional information storage unit 31, obtaining the size of a region (person presence region) where the person frame is present on a captured image, and comparing the size of the person presence region and the level of a numerical value of stay information represented by a heat map image. In the calculation of similarities, the similarities may be calculated through appropriate calculation such as division.

FIG. 15A shows a display image at a certain time. According to a heat map image within the display image, a stay degree is low in a first measurement area, and a stay degree is high in a second measurement area. In a background image, the number of persons is large in the first measurement area, and the number of persons in the second measurement area is small, and thus background image and the heat map image does not match.

FIG. 15B shows person frames detected from a captured image. Similarities in the respective measurement areas are calculated by obtaining the size of a person presence region in each measurement area and comparing the size of the person presence region in each measurement area and a stay degree represented by a heat map image. In the examples shown in FIGS. 15A and 15B, the person presence region is large in the first measurement area, and the person presence region is small in the second measurement area. Since the size of the person presence region in each measurement area and the stay degree represented by a heat map image do not correspond to each other, the similarity becomes lower.

As described above, in the present exemplary embodiment, similarity calculator 51 calculates a similarity between a captured image and stay information, and background image selector 52 selects a captured image to be used as a background image from a plurality of captured images on the basis of the similarity calculated by similarity calculator 51. For this reason, the background image matches the heat map image. Accordingly, it is possible to prevent a user from being given an uncomfortable feeling.

First Modified Example of Third Exemplary Embodiment

Figure 16:
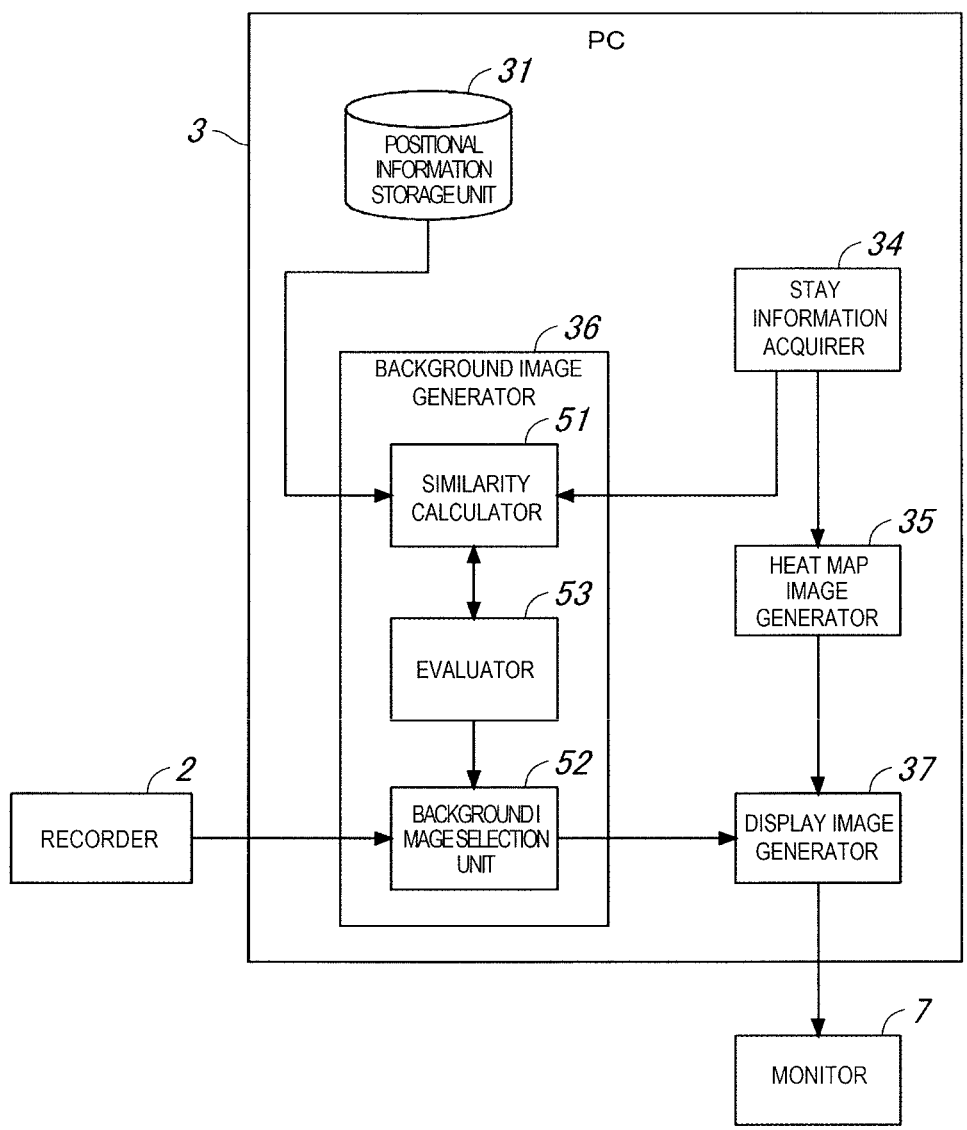
FIG. 16 is a functional block diagram showing a schematic configuration of a PC according to a first modified example of the third exemplary embodiment.
Figure 17:
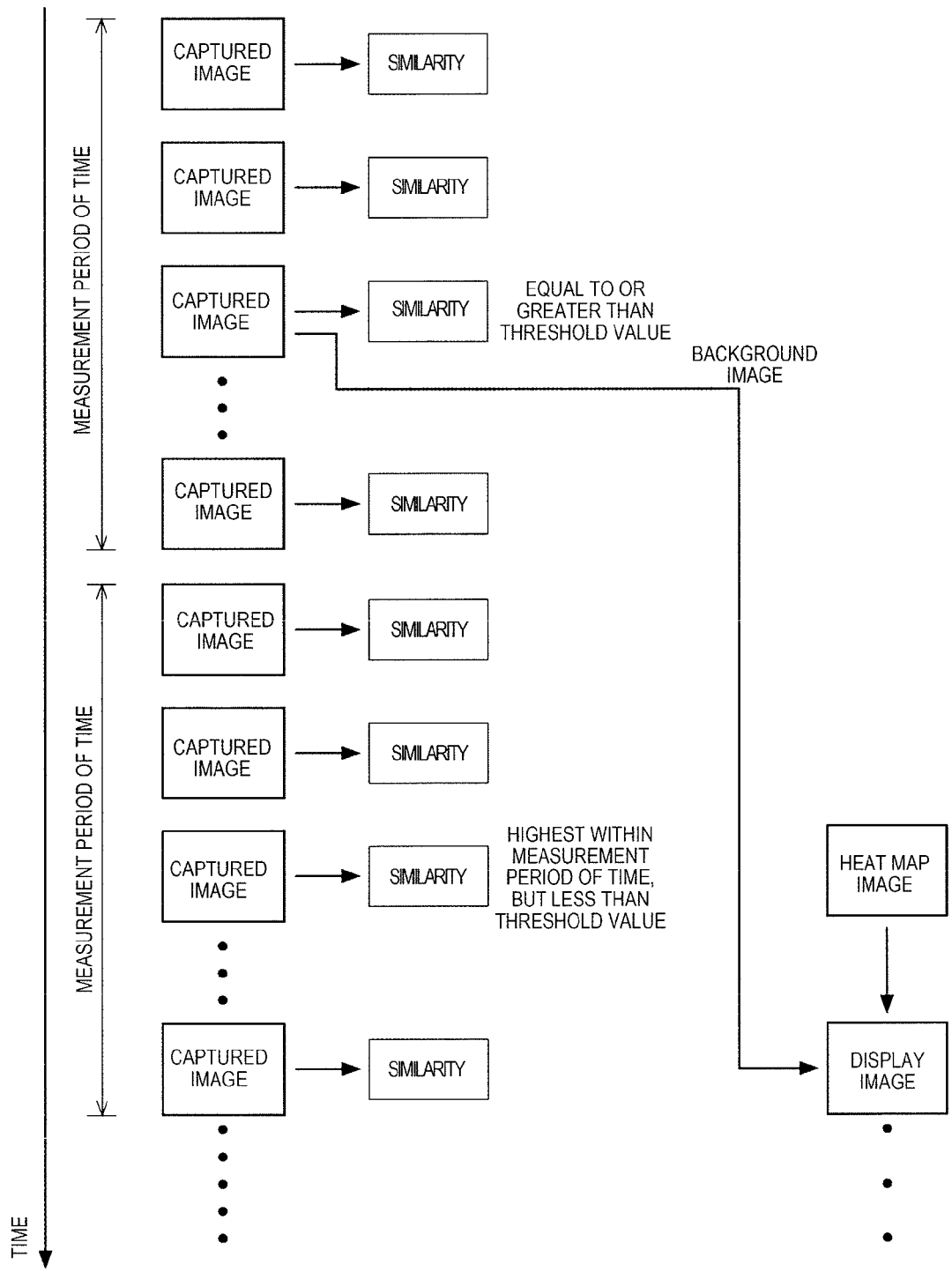
FIG. 17 is a diagram illustrating an outline of a background image generation process performed by the background image generator.

Next, a first modified example of the third exemplary embodiment will be described. FIG. 16 is a functional block diagram showing a schematic configuration of PC 3 according to the first modified example of the third exemplary embodiment. FIG. 17 is a diagram illustrating an outline of a background image generation process performed by background image generator 36 shown in FIG. 16.

In the third exemplary embodiment, a background image is selected on the basis of only similarities between captured images and stay information. That is, a captured image having the highest similarity within a measurement period of time of stay information is selected as a background image. However, in the first modified example, it is evaluated whether or not a captured image selected on the basis of similarities is suitable for a background image. As shown in FIG. 16, background image generator 36 includes evaluator 53, in addition to similarity calculator 51 and background image selector 52.

Evaluator 53 compares the highest similarity among the similarities between captured images at the respective times which are calculated by similarity calculator 51 with a predetermined threshold value to thereby perform a process of evaluating whether or not the captured image thereof is suitable for a background image. Here, when the similarity is equal to or greater than the threshold value, it is evaluated that the captured image is suitable for a background image. On the other hand, when the similarity is less than the threshold value, it is evaluated that the captured image is not suitable for a background image.

As shown in FIG. 17, the evaluation by evaluator 53 is performed on captured images at the respective times within a measurement period of time of stay information. When it is evaluated that all of the captured images at the respective times within a measurement period of time of stay information are not suitable for a background image, the evaluation is performed on captured images during another measurement period of time, for example, during the previous measurement period of time. When a captured image suitable for a background image is searched for, the captured image is selected as a background image.

Incidentally, in the first modified example of the third exemplary embodiment, evaluator 53 evaluates whether or not a captured image is suitable for a background image. However, even when a captured image which has the highest similarity within a measurement period of time of stay information and of which the similarity is equal to or greater than a threshold value is selected as a background image, display images during temporally adjacent measurement period of times may not match, as shown in FIG. 7A.

Consequently, evaluator 53 may perform evaluation on temporal matching, that is, matching between display images during temporally adjacent measurement period of times, in addition to evaluation using a threshold value. In the evaluation on the temporal matching, when it is evaluated that a captured image selected from captured images within a measurement period of time of stay information is not suitable for a background image, background image selector 52 selects a more appropriate captured image as a background image from captured images during another measurement period of time, for example, the previous measurement period of time.

As described above, in the present modified example, evaluator 53 evaluates whether or not a captured image is suitable for a background image by comparing the similarity calculated by similarity calculator 51 with a predetermined threshold value, and the captured image evaluated, by evaluator 53, to be suitable for a background image is selected as a background image. For this reason, the background image reliably matches a heat map image, and thus it is possible to reliably prevent a user from being given an uncomfortable feeling.

Figure 18:
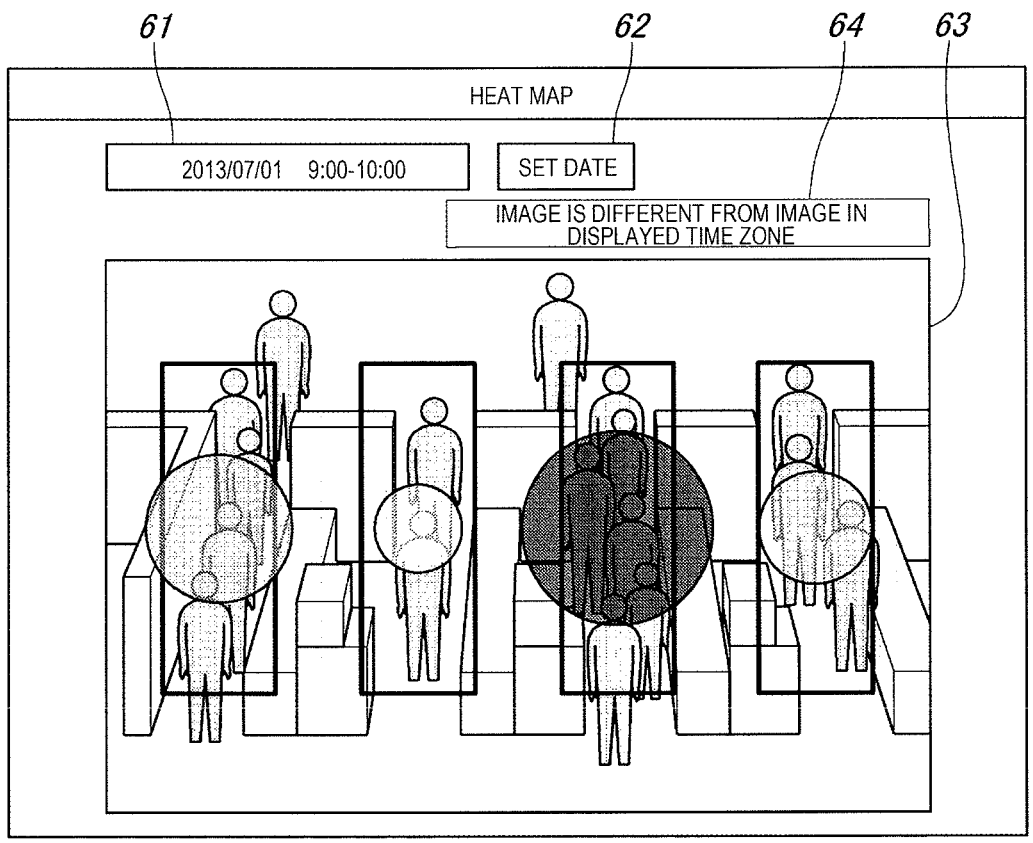
FIG. 18 is a diagram illustrating a heat map display screen displayed on a monitor.

FIG. 18 is a diagram illustrating a heat map display screen displayed on monitor 7. The heat map display screen is provided with date display unit 61, date setting button 62, heat map display unit 63, and notice display unit 64.

A display image obtained by superimposing a heat map image on a background image is displayed on heat map display unit 63. Date display unit 61 displays a date, and date setting button 62 sets a date. When date setting button 62 is operated, a date setting screen not shown in the drawing is displayed. Here, a date is selected, and then the selected date is displayed on date display unit 61. Then, a display image of the selected date is displayed on heat map display unit 63.

When a captured image at a time different from a time zone displayed (a measurement period of time of a heat map image) is selected as a background image, characters to that effect are displayed on notice display unit 64. Thereby, it is possible to prevent a situation of a target area from being erroneously supposed from a background image. That is, when a captured image at a time different from a time zone displayed is selected as a background image due to an actual situation of the target area changing every moment, for example, a person who is not present in the displayed time zone may appear in a background image. In this case, an erroneous supposition may be performed from the background image. However, notice display unit 64 performs a display to the effect that a captured image at a time different from the displayed time zone has been selected as a background image, and thus it is possible to prevent an erroneous supposition from occurring.

The display to the effect that a captured image at a time different from a time zone displayed (a measurement period of time of a heat map image) has been selected as a background image is not limited to a display using characters, and may be an emphasis display such as coloring performed on a frame portion of heat map display unit 63 or may be a display using an icon or the like.

As shown in FIGS. 11A and 11B and FIGS. 12A and 12B, even when a digest image is used as a background image, a heat map display screen may be provided with notice display unit 64. In this case, characters indicating a digest image are displayed on notice display unit. A digest image may be displayed using an emphasis display of heat map display unit 63, an icon, or the like. In this manner, a user can ascertain that a background image is a digest image instead of being an actual captured image.

Second Modified Example of Third Exemplary Embodiment

Figure 19:
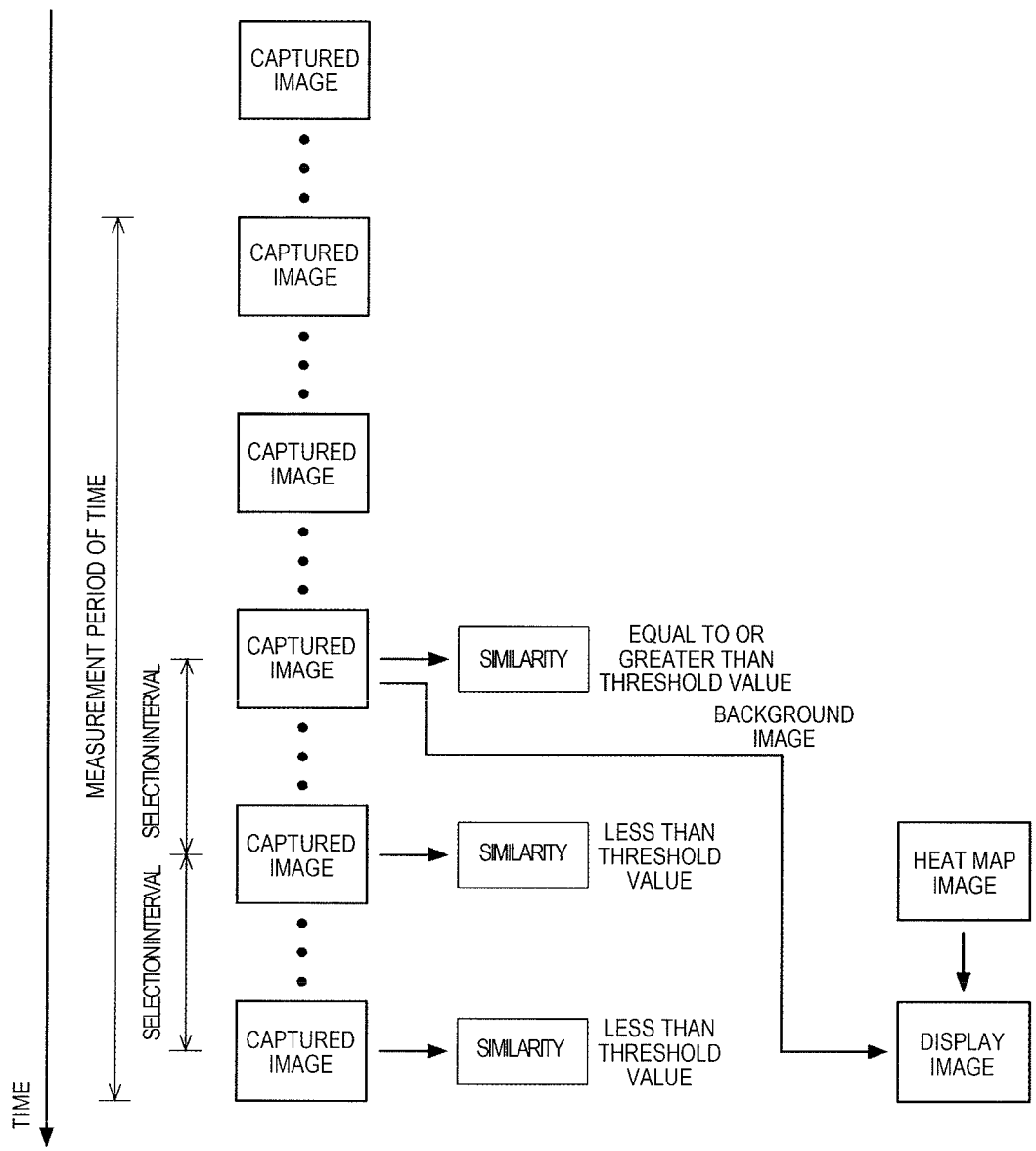
FIG. 19 is a diagram illustrating an outline of a background image generation process performed by a background image generator of a PC according to a second modified example of the third exemplary embodiment.

Next, a second modified example of the third exemplary embodiment will be described. FIG. 19 is a diagram illustrating an outline of a background image generation process performed by background image generator 36 of PC 3 according to the second modified example of the third exemplary embodiment. A schematic configuration of PC 3 in the second modified example is the same as that in the first modified example shown in FIG. 16.

Similarly to the first modified example, in the second modified example, it is evaluated whether or not a captured image is suitable for a background image by comparing a similarity between the captured image and stay information with a threshold value. Particularly, in the second modified example, a captured image suitable for a background image is searched for by selecting a captured image serving as a candidate according to a predetermined candidate selection rule.

Specifically, first, similarity calculator 51 calculates a similarity of a captured image at a point in time of the termination of a measurement period of time of stay information, and evaluator 53 evaluates whether or not the captured image is suitable for a background image. When it is evaluated that the captured image is not suitable for a background image, a captured image serving as a candidate is selected according to a predetermined candidate selection rule. Then, it is evaluated again whether or not the captured image is suitable for a background image. The selection and evaluation of a captured image are repeated until a captured image evaluated to be suitable for a background image is searched for. When a captured image suitable for a background image is searched for, background image selector 52 selects the captured image as a background image and outputs the captured image.

Particularly, in the example shown in FIG. 19, as a candidate selection rule, a captured image at a time tracing back to the past by a predetermined selection interval shorter than a measurement period of time, for example, 10 minutes is selected. A captured image tracing back by the selection interval is selected from captured images at a point in time of the termination of a measurement period of time of stay information, and evaluation regarding whether or not the captured image is suitable for a background image is repeated, and thus a captured image suitable for a background image is searched for.

In the second modified example, evaluation is performed by selecting one captured image tracing back by a selection interval. The evaluation is performed on a plurality of captured images within a selection interval. When it is evaluated that all of the captured images are not suitable for a background image, the evaluation is performed on a plurality of captured images within the previous selection interval. The evaluation may be repeated until a captured image evaluated to be suitable for a background image is searched for.

Next, another example of heat map image 23 shown in FIG. 4 will be described. FIGS. 20A to 20E are diagrams illustrating other examples of heat map image 23.

In the example shown in FIG. 4, frame image 22 showing a measurement area and heat map image 23 showing stay information (a stay degree and a stay duration) are displayed so as to be superimposed on background image 21. In particular, heat map image 23 is expressed using a circle, but may be constituted by at least one of a figure, a character, and a sign. That is, the heat map image may be expressed using a figure other than a circle, for example, a square. Further, heat map image 23 may be expressed using, for example, a sign or a character other than a figure.

In the example shown in FIG. 4, a stay degree is expressed by the size of heat map image 23, and the length of a stay duration is expressed by the density of a paint-out color of heat map image 23. However, the level of a numerical value of stay information (a stay degree and a stay duration) may be expressed by properties of heat map image 23, that is, at least one of the size of heat map image 23, a paint-out color of heat map image 23, a color tone of a contour line of heat map image 23, color density, and color thickness.

Figure 20A:
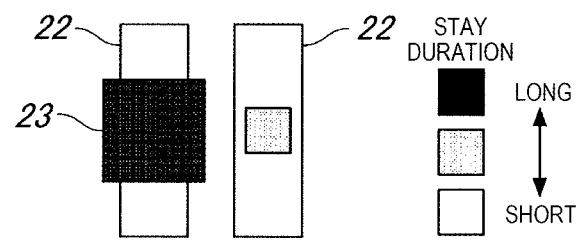
FIGS. 20A to 20E are diagrams illustrating other examples of a heat map image.
Figure 20B:
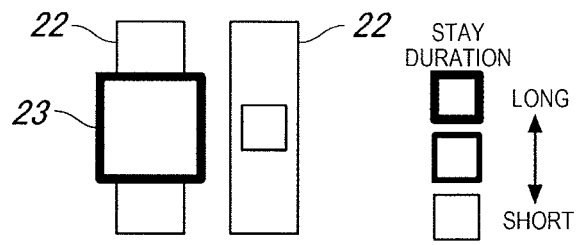
Figure 20C:
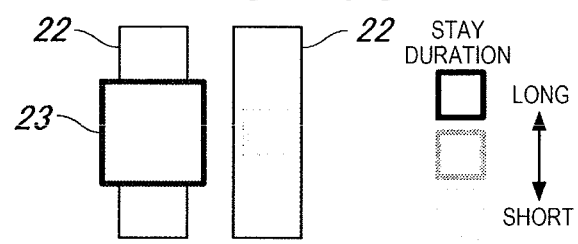

For example, in the examples shown in FIGS. 20A to 20C, heat map image 23 is constituted by a square. Particularly, in the examples shown in FIGS. 20A to 20C, a stay degree may be expressed by a square size. In the example shown in FIG. 20A, the length of a stay duration is expressed by the density of a square paint-out color. In the example shown in FIG. 20B, the length of a stay duration is expressed by the thickness of a square contour line. In the example shown in FIG. 20C, the length of a stay duration is expressed by the color density of a square contour line. In the examples shown in FIGS. 20A and 20C, the length of the stay duration may be expressed by a color tone instead of the color density.

Figure 20D:
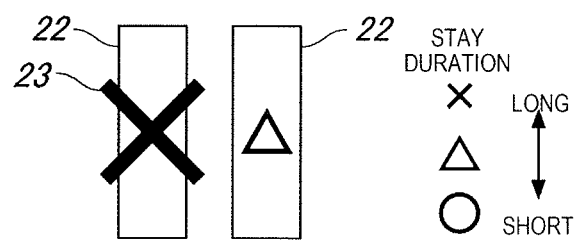
Figure 20E:
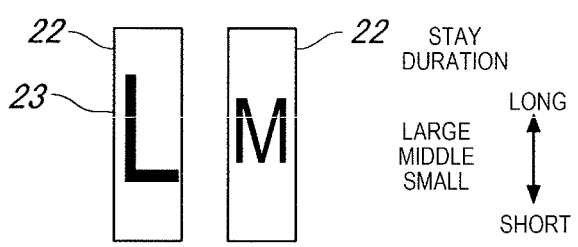

In the example shown in FIG. 20D, heat map image 23 is constituted by a sign. Particularly, here, a stay degree is expressed by the size of the sign, and the length of a stay duration is expressed by a sign. In the example shown in FIG. 20E, heat map image 23 is constituted by a character. Particularly, here, a stay degree is expressed by the size of the character, and the length of a stay duration is expressed by a character.

Figure 21:
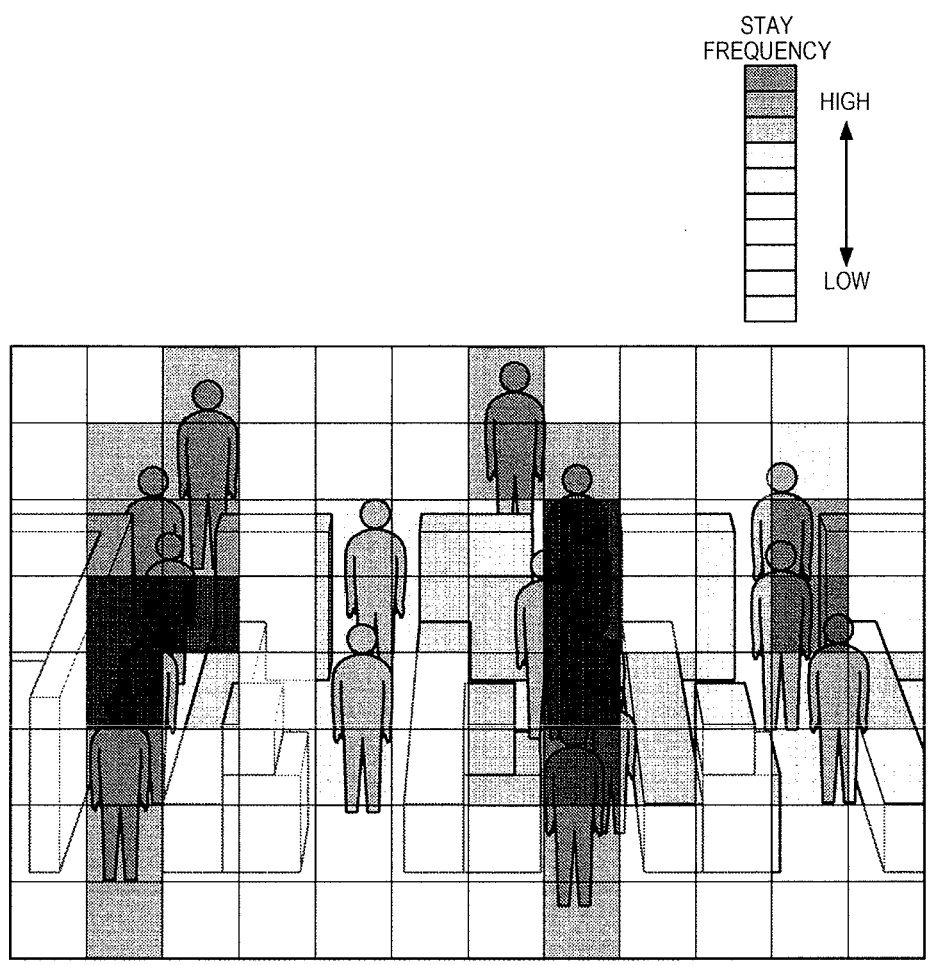
FIG. 21 is a diagram illustrating a region dividing heat map image.

Next, a region dividing heat map image will be described. FIG. 21 is a diagram illustrating a region dividing heat map image.

In the example shown in FIG. 4, a measurement area (target area) is set within a monitoring area (imaging area of a camera), and heat map image 23 indicating stay information for each measurement area is superimposed on a background image. In the example shown in FIG. 21, the whole monitoring area is set as a target area, the target area is divided into a plurality of grids (divided regions), and a heat map image indicating a stay degree for each grid is superimposed on a background image. Thereby, it is possible to visualize a distribution situation of the stay degree in the target area by the heat map images.

In this heat map image, at least one visualization element of color, light and shade, and a patterned image is changed in accordance with a stay degree (the number of staying persons) of a person, and thus it is possible to visualize the stay degree of the person. In the example shown in FIG. 21, a stay degree for each grid is expressed by light and shade (density of a paint-out color).

In order to generate such a heat map image, a stay degree for each grid may be obtained by counting the number of traffic lines of persons having passed the grids within a measurement period of time.

Figure 22:
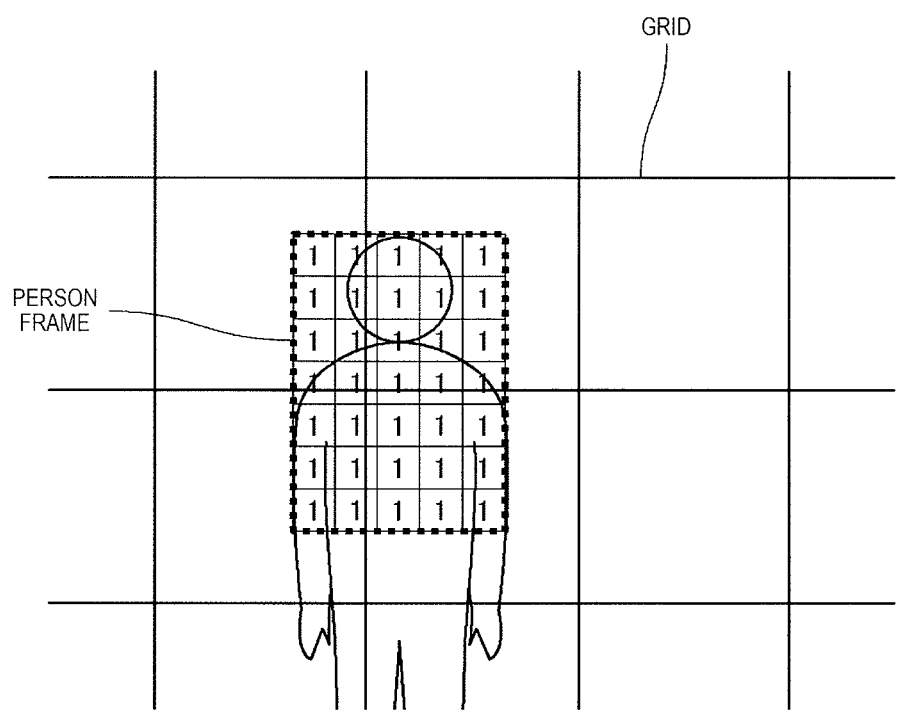
FIG. 22 is a diagram illustrating another example of a stay information acquisition process performed by a stay information acquirer.

Next, another example of a stay information acquisition process performed by stay information acquirer 34 shown in FIG. 5 will be described. FIG. 22 is a diagram illustrating another example of a stay information acquisition process performed by stay information acquirer 34. This example is applied to a case where a region dividing heat map image shown in FIG. 21 is generated.

In the first exemplary embodiment, a stay degree is acquired by counting the number of traffic lines. However, in the example shown in FIG. 22, a stay degree (counter value) for each pixel is acquired by counting the number of times that being located within a person frame (region where a person is present) occurs for each pixel (detection element), and moving object action values in units of pixels are integrated in units of grids through an appropriate statistical process, and thus the stay degrees in units of grids are acquired.

Here, a process of detecting a person frame from a captured image is performed by moving object detection device 4. In the process of integrating the pixel-based moving object action value in units of grids, for example, an average value of stay degrees of pixels within a grid, that is, a value obtained by adding stay degrees of all of the pixels within the grid and dividing the added value by the number of pixels within the grid may be set as a stay degree of the grid.

Here, a stay degree is acquired by counting the number of times of location within a person frame, but stay degrees in units of grids may be acquired by counting the number of times that a center point of the person frame is located within a grid. In the method shown in FIG. 22, it is not necessary to acquire a traffic line for each person, and thus it is possible to omit traffic line acquirer 32 and traffic line information storage unit 33 shown in FIG. 5.

Although the invention has been described so far on the basis the specific exemplary embodiments, these exemplary embodiments are merely examples, and the invention is not limited by these exemplary embodiments. The components of the stay condition analyzing apparatus, the stay condition analyzing system, and the stay condition analyzing method according to the above-described exemplary embodiments of the invention are not necessarily essential, and can be appropriately selected as long as the components do not deviate from at least the scope of the invention.

For example, in the above-described exemplary embodiments, a checkout counter of a retail store such as a supermarket is used as a target area. However, a location where a queue is likely to be formed, for example, an ATM corner of a bank, an entrance gate and a reception of various types of halls for an event and an exhibition, an exhibition panel, and the front of an exhibition booth may also be used as a target area.

In the above-described exemplary embodiments, an example in which a person is used as a moving object serving as a target for measurement of stay information (a stay degree and a stay duration) has been described. However, a moving object other than a person, for example, a vehicle such as a car or a bicycle is used as a target, and the target can be used to ascertain a stay condition of the vehicle entering a parking lot.

In the above-described exemplary embodiments, moving object detection device 4 detects a moving object from an image captured by camera 1 through image analysis and outputs the positional information thereof. However, in addition to such a configuration, it is possible to adopt a configuration in which a moving object is detected using a radio signal, for example, a configuration in which a tag attached to a moving object is detected using a sensor, a configuration using a global positioning system (GPS), and a configuration in which a position sensor for detecting a person using light is used.

In the above-described exemplary embodiments, examples of a heat map image indicating stay information is shown in FIGS. 4 and 21. However, the heat map image is not limited to the examples, and stay information may be expressed using various drawing methods. For example, the levels of numerical values of stay information may be classified by color in the form of a contour line and displayed.

In the above-described exemplary embodiments, moving object detection device 4 is provided, separate from camera 1. However, as described above, it is also possible to configure an image device with a moving object detection function by integrating some or all of the functions of the moving object detection device into camera 1. It is also possible to constitute moving object detection device 4 by PC 3.

In the above-described exemplary embodiments, PC 3 performs processes required to analyze a stay condition, and a stay condition analysis result, that is, a display image obtained by superimposing a heat map image on a background image is displayed on monitor 7 of PC 3. However, an information processing apparatus different from an information processing apparatus performing processes required to analyze a stay condition, for example, a portable terminal such as PC 11 installed in a head office or smartphone 13, as shown in FIG. 1, may be configured as a browsing device of a stay condition analysis result.

In the above-described exemplary embodiments, PC 3 provided in a store performs processes required to analyze a stay condition. However, the required processes may be performed by PC 11 provided in a head office or cloud computer 12 constituting a cloud computing system. The required processes are shared between a plurality of information processing apparatuses, and information may be transmitted and received between the plurality of information processing apparatuses through a communication medium such as an IP network or a LAN. In this case, a stay condition analyzing system is constituted by the plurality of information processing apparatuses sharing the required processes.

In such a configuration, a process having at least a large computation among the processes required to analyze a stay condition, for example, a moving object detection process and a traffic line acquisition process may be performed by an apparatus such as PC 3 provided in a store. In such a configuration, only a small amount of data of information is required in the remaining processes. Accordingly, even when the remaining processes are performed by an information processing apparatus installed in a location different from a store, for example, PC 11 installed in a head office, it is possible to reduce a communication load, and thus the operation of a system through a wide area network connection is facilitated.

A process having at least a large computation among the processes required to analyze a stay condition, for example, a moving object detection process and a traffic line acquisition process may be performed by cloud computer 12. In such a configuration, since the remaining processes require only a small computation amount, a user side such as a store does not require a high-speed information processing apparatus, and thus it is possible to reduce costs borne by a user.

When cloud computer 12 performs all of the required processes and is given at least a function of outputting a stay condition analysis result, the stay condition analysis result can be displayed also on a portable terminal such as smartphone 13, in addition to PCs 3 and 11 provided in a store and a head office. Thereby, it is possible to confirm a stay condition in an arbitrary location such as a going-out destination other than a store and a head office.

In the above-described exemplary embodiments, various characteristic configurations have been described. However, these configurations are not limited to a combination shown in each exemplary embodiment, and configurations shown in the respective exemplary embodiments may be appropriately combined. In particular, image processing for reducing the discriminability of a person appearing in a captured image according to the first exemplary embodiment is effective from the viewpoint of the protection of person's privacy, and the image processing for reducing discriminability can also be applied to the digest images generated in the second and third exemplary embodiments. In the protection of person's privacy, operation through a combination of such exemplary embodiments is required.

A stay condition analyzing apparatus, a stay condition analyzing system, and a stay condition analyzing method according to the invention have an effect of obtaining a natural display image by reducing an uncomfortable feeling due to mismatch between a background image and a heat map image when the heat map image obtained by visualizing stay information of a moving object within a target area is displayed so as to be superimposed on the background image generated from captured images of the target area, and are useful as a stay condition analyzing apparatus, a stay condition analyzing system, and a stay condition analyzing method for acquiring stay information regarding a stay condition of a moving object within a target area, generating a heat map image obtained by visualizing the stay information, and displaying the heat map image on a display device.

What is claimed is:

1. A stay condition analyzing apparatus that acquires stay information regarding a stay condition of a plurality of moving objects within a target area, generates a heat map image obtained by visualizing the stay information, and displays the heat map image on a display device, the stay condition analyzing apparatus comprising:
   a processor;
   a memory which stores an instruction, wherein as a configuration when the processor executes the instruction stored in the memory;
   a stay information acquirer which acquires, from a plurality of captured images of a same target area, the stay information corresponding to the same target area for each predetermined measurement period of time based on positional information of the moving objects acquired, the plurality of captured images being captured with respect to time;
   a heat map image generator which generates the heat map image obtained by visualizing the stay information acquired by the stay information acquirer, the heat map image indicating a heat area corresponding to the stay information of the moving objects;
   a background image generator which selects a target image from the plurality of captured images of the same target area with respect to time, and sets the selected target image as a background image; and
   a display image generator which generates a display image by superimposing the heat map image generated by the heat map image generator on the background image selected by the background image generator,
   wherein the background image generator includes
      a similarity calculator which calculates a similarity of positional information of the moving objects included in each of the plurality of captured images of the same target area and the stay information of the same target area, and
      a background image selector which selects the target image among the plurality of captured images to be used as the background image based on the similarity calculated by the similarity calculator.

2. The stay condition analyzing apparatus of claim 1, wherein the background image generator further includes an evaluator that evaluates whether or not the selected target image is suitable as the background image by comparing the similarity calculated by the similarity calculator with a predetermined threshold value.

3. A stay condition analyzing system that acquires stay information regarding a stay condition of a plurality of moving objects within a target area, generates a heat map image obtained by visualizing the stay information, and displays the heat map image on a display device, the stay condition analyzing system comprising:
   a camera which captures an image of the target area;
   a plurality of information processing apparatuses,
      wherein each of the plurality of information processing apparatuses includes a processor and a memory that stores an instruction, and
      wherein, when the processor executes the instruction stored in the memory;
   a moving object detector which detects the moving objects from the image captured by the camera and acquires positional information of the moving objects;
   a stay information acquirer which acquires, from a plurality of captured images of a same target area, the stay information corresponding to the same target area for each predetermined measurement period of time based on the positional information of the moving objects;
   a heat map image generator which generates the heat map image obtained by visualizing the stay information acquired by the stay information acquirer, the heat map image indicating a heat area corresponding to the stay information of the moving objects;
   a background image generator which selects a target image from the plurality of captured images of the same target area with respect to time, and sets the selected target image as a background image; and
   a display image generator which generates a display image by superimposing the heat map image generated by the heat map image generator on the background image selected by the background image generator,
   wherein the background image generator includes
      a similarity calculator which calculates a similarity of positional information of the moving objects included in each of the plurality of captured images of the same target area and the stay information of the same target area, and a background image selector which selects the target image among the plurality of captured images to be used as the background image based on the similarity calculated by the similarity calculator.

4. A stay condition analyzing method of causing an information processing apparatus to perform a process of acquiring stay information regarding a stay condition of a plurality of moving objects within a target area, generating a heat map image obtained by visualizing the stay information, and displaying the heat map image on a display device, the stay condition analyzing method comprising, when a processor of the information processing apparatus executes an instruction stored in a memory:

acquiring, from a plurality of captured images of a same target area, the stay information corresponding to the same target area for each predetermined measurement period of time based on positional information of the moving objects acquired, the plurality of captured images being captured with respect to time;

generating the heat map image obtained by visualizing the acquired stay information, the heat map image indicating a heat area corresponding to the stay information of the moving objects;

selecting a target image from the plurality of captured images of the same target area with respect to time, and sets the selected target image as a background image; and generating a display image by superimposing the generated heat map image on the selected background image, wherein the selecting the background image includes calculating a similarity of positional information of the moving objects included in each of the plurality of captured images of the same target area and the stay information of the same target area, and selecting the target image among the plurality of captured images to be used as the background image based on the calculated similarity.

5. The stay condition analyzing apparatus of claim 1, wherein the stay information includes duration of stay and frequency of stay at a particular position within the target area by a moving object, and wherein a degree of heat of the heat area is indicated based on a size and color of an indicator overlapping the display image.

6. The stay condition analyzing apparatus of claim 1, wherein at least one of the plurality of moving objects is included in the display image.

7. The stay condition analyzing apparatus of claim 1, wherein at least one of the plurality of moving objects is overlapping with the heat area included in the heat map.

* * * * *